United States Patent [19]
Sevenish et al.

[11] Patent Number: 6,133,172
[45] Date of Patent: Oct. 17, 2000

[54] FIBROUS MOLDABLE MEDIA CONTAINING A FOAMED RESIN DISPERSED THROUGHOUT USEFUL AS THERMAL AND ACOUSTICAL INSULATION

[75] Inventors: Scott W. Sevenish, Reynoldsburg; Kimberley A. Householder, Pickerington; Stanley J. Rusek, Granville; Jerry L. Maines, Glenford, all of Ohio

[73] Assignee: Owens Corning Fiberglas Technology, Inc., Summit, Ill.

[21] Appl. No.: 09/001,633

[22] Filed: Dec. 31, 1997

Related U.S. Application Data

[60] Provisional application No. 60/072,097, Jan. 8, 1997, provisional application No. 60/042,138, Apr. 8, 1997, and provisional application No. 60/049,505, Jun. 13, 1997.

[51] Int. Cl.[7] .................................................. B32B 27/04
[52] U.S. Cl. ........................ 442/370; 442/164; 442/168; 442/170; 442/171
[58] Field of Search .................................. 442/120, 164, 442/168, 170, 171, 104, 370

[56] References Cited

U.S. PATENT DOCUMENTS

| | | |
|---|---|---|
| 4,288,475 | 9/1981 | Meeker . |
| 4,473,428 | 9/1984 | Buck, Jr. et al. . |
| 4,476,183 | 10/1984 | Holtrop et al. . |
| 4,477,516 | 10/1984 | Sugihara et al. . |
| 4,478,660 | 10/1984 | Landler et al. . |
| 4,550,050 | 10/1985 | Buck, Jr. . |
| 4,570,859 | 2/1986 | Klett et al. . |
| 4,600,621 | 7/1986 | Maurer et al. . |
| 4,610,478 | 9/1986 | Tervol . |
| 4,840,831 | 6/1989 | Weinle et al. . |
| 4,840,832 | 6/1989 | Weinle et al. . |
| 4,956,409 | 9/1990 | Sieloff . |
| 5,145,527 | 9/1992 | Clifford et al. . |
| 5,149,920 | 9/1992 | Meeker et al. . |
| 5,164,254 | 11/1992 | Todd et al. . |
| 5,503,903 | 4/1996 | Bainbridge et al. . |
| 5,591,289 | 1/1997 | Souders et al. . |
| 5,660,908 | 8/1997 | Kelman et al. . |
| 5,840,413 | 11/1998 | Kajander . |

Primary Examiner—Deborah Jones
Assistant Examiner—Jason Savage
Attorney, Agent, or Firm—Inger H. Eckert; Stephen W. Barns

[57] ABSTRACT

The present invention provides a molding media and method of producing resin stabilized polymeric fiber mats useful as thermal and acoustical insulation. The molding media and method of the invention lower the cost of producing such mats while still maintaining the necessary mechanical and acoustical properties. One embodiment of the molding media and method of the invention further provides environmental advantages over glass fiber and foam mats.

17 Claims, 13 Drawing Sheets

FIG. 13B

Airflow Summary

Owens Corning Sound & Vibration Laboratory

Title: ASTM CS22-93 Airflow Resistance of P56241 New Molded Ceiling Tile

| New Molded Ceiling Tile (White) Sample No. | Thickness Inch | Density (pcf) | Airflow Resistance (acoustic ohms) | Specific Airflow Resistance (mks rayts) | Airflow Resistivity (mks rayts/m) |
|---|---|---|---|---|---|
| 1A | 0.75 | 7.037 | 175815.81 | 1325.50 | 69580.05 |
| 1B | 0.75 | 6.746 | 154792.19 | 1167.00 | 61259.84 |
| 1C | 0.75 | 6.785 | 143398.32 | 1081.10 | 56750.66 |
| Average | 0.75 | 6.86 | 158002.11 | 1191.20 | 62530.18 |

| New Molded Ceiling Tile (Green) Sample No. | Thickness Inch | Density (pcf) | Airflow Resistance (acoustic ohms) | Specific Airflow Resistance (mks rayts) | Airflow Resistivity (mks rayts/m) |
|---|---|---|---|---|---|
| 2A | 0.75 | 7.485 | 188032.06 | 1417.60 | 74414.70 |
| 2B | 0.75 | 7.878 | 190074.73 | 1433.00 | 75223.10 |
| 2C | 0.75 | 7.111 | 172194.71 | 1298.20 | 68146.98 |
| Average | 0.75 | 7.49 | 183433.83 | 1382.93 | 72594.93 |

| New Molded Ceiling Tile (Duct Board, Baseline) Sample No. | Thickness Inch | Density (pcf) | Airflow Resistance (acoustic ohms) | Specific Airflow Resistance (mks rayts) | Airflow Resistivity (mks rayts/m) |
|---|---|---|---|---|---|
| 3A | 0.75 | 5.642 | 75483.41 | 569.06 | 29872.97 |
| 3B | 0.75 | 5.459 | 98142.49 | 739.91 | 38840.42 |
| 3C | 0.75 | 6.120 | 112902.80 | 851.19 | 44681.89 |
| Average | 0.75 | 5.74 | 95509.57 | 720.06 | 37798.43 |

FIBROUS MOLDABLE MEDIA CONTAINING A FOAMED RESIN DISPERSED THROUGHOUT USEFUL AS THERMAL AND ACOUSTICAL INSULATION

This application claims the benefit of priority under 35 U.S.C. §119(e) of the following prior filed co-pending provisional applications: Ser. Nos. 60/072,097, filed Jan. 8, 1997; 60/042,138 filed Apr. 8, 1997; and 60/049,505 filed Jun. 13, 1997.

TECHNICAL FIELD AND INDUSTRIAL APPLICABILITY OF THE INVENTION

The present invention provides a method of producing resin stabilized polymeric fiber molding media useful for a variety of purposes, including as thermal and acoustical insulation, and in structural load-bearing parts. The method of the invention can lower the cost and weight of producing such media while still maintaining the necessary mechanical and acoustical properties. The method of the invention further provides a resinated polymeric fiber molding media that can have environmental advantages over glass fiber and foam mats. In addition, the resinated polymeric fiber molding media of the invention allows for a one step hot molding process to be used.

BACKGROUND OF THE INVENTION

Fiber and foam panels or mats are well known and widely used throughout the construction and automotive industries as thermal and sound insulating material. Such panels or mats are manufactured from a wide variety of fibers and foams, such as compressed wood, cork, cane, rock wool, gypsum, or glass fibers, and foams. Typically, the formed mats are used in wall or ceiling construction as sound absorbers in mechanical suspension systems, and sound insulating and transmittance reducing media.

During the 1970s and early 1980s, the transportation industry primarily used glass fiber batts to provide sound insulation in vehicles. However, as a result of irritation to workers handling the mats the industry has moved to using less irritating foam mats. Unfortunately, although the foam is less irritating and is roughly comparable in cost to the glass fiber batts, the foam has the disadvantage that it is not easily recyclable.

Most foam fiber mats are typically a multilayer product of glass and foam; thus the main impediment to recycling of foam is the fact that the layers of glass and foam would need to be separated before recycling could be attempted. An added disadvantage with foam is that due to the layering in foam the fiber mats can be more complicated to mold.

Recently, attempts have been made to produce insulating mats for the transportation industry from polyester since, unlike foam, the polyester fiber mats would be recyclable. To date, the polyester fiber mats produced for the transportation industry have a basis weight of about 140–144 g/ft$^2$. Due to the high basis weight such polyester fiber mats are uneconomical and have not been adopted by the industry despite the environmental advantages. Thus a need exists for a method of producing an economical insulating fiber molding media that meets or exceeds environmental and handling criteria while still maintaining physical property requirements. These needs are met by the resin stabilized polymeric fiber molding media of the invention.

SUMMARY OF THE INVENTION

The present invention provides a moldable sound and thermal insulating material exhibiting good sound absorption and dimensional stability. The sound absorption material of the present invention is formed by a number of different embodiments. In one embodiment the sound absorption material is formed of a polymeric fiber mat stabilized with a cured resinous foam. In addition, the present invention provides a method of forming such fiber mats by foaming resin through a polymer fiber mat and curing the resin. The resinated polymeric mat of the invention also allows for a single step hot molding process to be used even when applying a foamed back facing.

Accordingly, the present invention provides a resin stabilized polymeric fiber molding media that is believed to exhibit low irritability when handled and to be easily recyclable, and that exhibits good mechanical strength and acoustical insulation properties, which can be produced economically due to the reduced amount of polymeric fibers needed in the mat as a result of the mechanical strength.

The invention additionally provides an unresinated polymeric fiber molding media that is reinforced with fibers ranging from straw and other natural fibers to thermoplastics such as polypropylene and polyester. The unresinated polymeric fiber is useful in applications wherein folding of the insulating material results in disruption of the resin solids.

The invention optionally further provides a sound absorption material that is formed as a layered composite. This layered composite sound absorption material is made up of a glass fiber wool or textile core sandwiched between two polymer fiber mat layers. The three layer composite is stabilized with a cured resinous foam. This optional composite is believed to exhibit low irritation when handled, and is believed to be easily recycled by stripping out the glass fiber core from the sandwich. This composite also provides good mechanical strength and acoustical properties.

One additional embodiment is directed to an encapsulated heat molded laminate comprising multiple layers. Number of layers ranges from 3 on up with 5 to 7 being typically preferred. Seven or more layers may be used so as to tune the acoustical performance. This multi-layered composite may be comprised of: a facer or shaper web layer; PET fibers and sheath fibers capable of heat setting; an optional glue web capable of binding to the adjacent core board or mat (sound absorbing layer, e.g., mineral wool); another optional glue web; a front facer or shaper web, and a finish fabric. This composite is useful as a decorative embossed acoustical absorber for ceilings and walls that is not only more cost effective to produce, but also provides better acoustical properties and aesthetics due to the moldability. In addition, the physically irritating layers such as mineral fiber wool cores can be totally encapsulated so as to make the final product more useable.

The present invention allows for many embodiments depending on the application. In addition, the acoustical properties of the resulting composites can be varied by changes or increases in porosity (Rayls). In particular, the acoustical performance is easily tuned for maximizing sound absorption by varying air porosity (Rayls) of the cover material and/or core material. In order to change the porosity, it is preferred that changes be made to either thickness, surface area, surface density, fiber diameter, fiber shape, or weight/amount of fibers.

DETAILED DESCRIPTION OF THE PREFERRED EMBODIMENTS OF THE INVENTION

Figure 1:
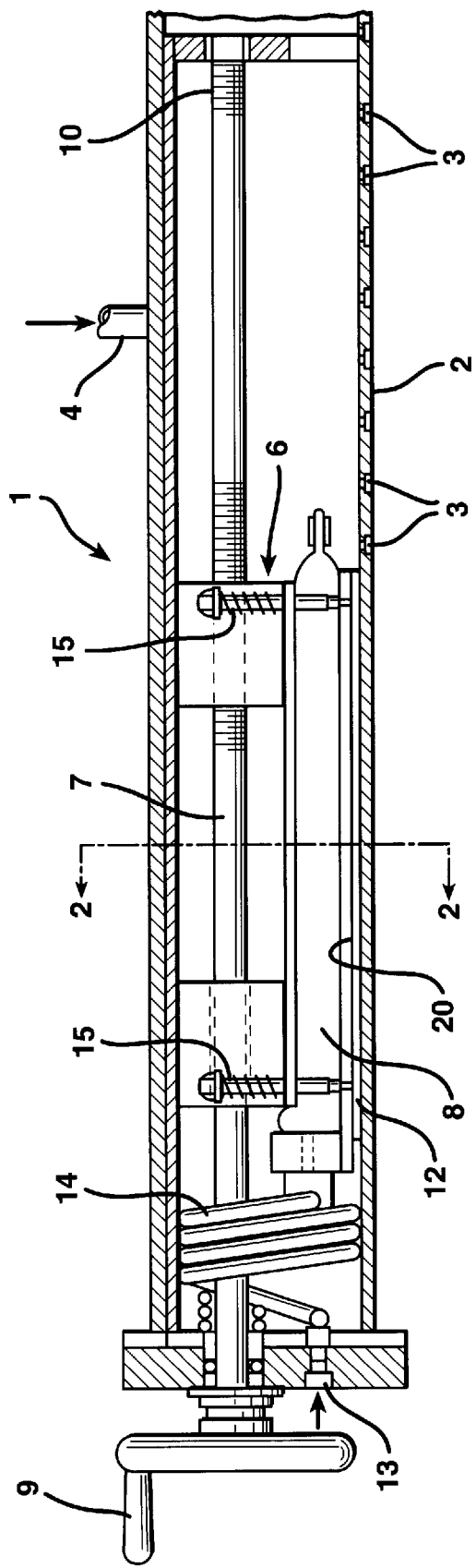
FIG. 1 is a representation of a dispenser for foaming resin.

The method of the present invention comprises providing a mat formed of polymeric fibers; foaming a resin; dispersing the foamed resin throughout the mat; removing the excess resin foam; and drying the resin stabilized polymeric mat to form a molding media. The method further includes molding the resinated polymeric media at an elevated temperature into a part. Standard molding processes may be used wherein a portion of the mat is moved into a hot press at an elevated temperature (for example, between about 375–450° F.). In the standard process, the molding mat is then moved to a second hot press where a foamed back facing is added at a temperature of about 350° F. In a preferred embodiment, however, the molding process is carried out in one step at about 400° F. In a particularly preferred embodiment, the one-step molding process is carried out at 375° F.

In one embodiment, the layered composite of the invention is made up of a glass fiber batt sandwiched between two layers of polymeric fiber mat. The layers are sandwiched together by any of the methods used in the art for combining fiber mats together. Typically, the layers are mechanically stacked one on top of the other and processed as with the single layer embodiment.

Glass fiber bafts to be used in the layered composite of the invention may be any glass fiber batt useful for forming insulation products, and a basic, bisected wool batt from the Owens-Corning plant in Newark, Ohio appears to work well.

Polymeric mats to be used in the invention may be any polymeric fibrous mat useful for forming insulation products. For example, mats may be made from polyester, polypropylene, thermoplastics, polycaprolactam, nylon 6, polyolefins, or phenolic resins. In a preferred embodiment, the polymeric mat is made from a nonwoven polyester as in the substantially thermoset polyester roll good obtainable from Vita Olympic, a division of Prelude Fiber. Whatever polymer or polyester fiber is selected, it must be able to withstand the temperatures of a drying oven without shrinking or turning brittle. A typical drying oven temperature can be about 300° Fahrenheit. In addition, the preferred polymeric fiber mats selected generally have about 10–20% binder fiber, such as Celbond™ binder fiber manufactured by Hoechst Celanese, for thicker mats such as mats made without a glass layer. Preferred thinner polymeric fiber mats, such as used in composite mats, generally have about 20–40% binder fiber. However in the unresinated polymeric fiber mats which are reinforced with fiber, the binder fiber is present in about 10–75%.

When fibers are used to reinforce the mats, the fibers may be any natural fiber, such as may be obtained from push brooms. The fibers may also be from straw or even thermoplastics such as polypropylene or polyester. A preferred fiber for reinforcement is spunbonded polyester obtained from Reemay (a BBA Nonwoven Company located in Old Hickory, Tenn.).

Resins that can be used herein include thermoplastics, resoles or low temperature phenolics. Almost any resin material that can be foamed or air-diluted can be used with the foam applicator. Usually aqueous based resinous resins such as arylics, phenolics, vinyls, urea and polyethelene are used to impregnate the fibrous material. However, it should be noted that other thermoplastic and thermoset resins having either an aqueous or solvent base can be used to impregnate the fibrous web if the resins are capable of being foamed. It is also possible to mix various resins together and apply the combined or mixed resins to the fibrous web. The resins can be mixed to obtain the desired properties for the resin system that is to be applied to the fibrous web. It is also possible to mix fillers in with the resin material. The fillers can be used to reduce the amount of resin required, to add weight to the impregnated fibrous web or to achieve a particular property in the impregnated web.

A preferred resin comprises an aqueous dispersion of urea, a resole, and an amino alkyl silane or silane hydrolysis product and a surfactant. In general, the silane or silane hydrolysis product should constitute in weight percent, from about 0.01 percent to about 3 percent of the total solids in the composition, urea should constitute from about 3 percent to about 60 percent, the phenolic resole should constitute from about 40 percent to about 97 percent, and the surfactant about 0.25 to about 10 percent. The preferred ranges are silane about 0.02 percent to about 2 percent, urea about 5 percent to about 45 percent, phenolic resole about 50 percent to about 90 percent, and the surfactant about 1.0 percent to about 8 percent.

A variety of phenolic resoles may be used in a composition according to the invention. Thus, the resole can be the partial condensation product of any suitable phenol with any suitable aldehyde (for a discussion of resoles, see Martin, The Chemistry of Phenolic Resin, John Wiley & Sons, Inc., New York 1956, particularly pages 87–98, and cited references). As a practical matter, however, a resole curable to an infusible resite is usually preferred for use in connection with polymeric fibers so that at least a significant amount of a trifunctional phenol, usually hydroxy benzene for economic reasons, is preferably employed. Formaldehyde is the preferred aldehyde not only for economic reasons, but also because of the greater simplicity of its chemical reactions with a phenol. Most desirably, the resole is produced by reaction of formaldehyde with phenol (hydroxy benzene) and usually in proportions from 1 mol to 4.5 mols, preferably from about 1.75 mols to about 4.2 mols of formaldehyde per mol of phenol.

Metallic cations, particularly highly alkaline metallic cations, if present in a phenolic resole applied to a polymer can be detrimental, apparently causing deterioration both of the fibers themselves and of the resite resin. Phenolic resoles are usually prepared in the presence of highly alkaline condensing agents so that the metallic cations thereof are preferably either removed from the resole prior to use, for example by cation exchange treatment of the resole, or converted to a form in which they are harmless. As an example of the latter technique, the condensation to produce the resole can be carried out in the presence of barium hydroxide as a condensing agent, and the barium hydroxide can be neutralized, after completion of the partial condensation to form the resole, with sulfuric acid or the like to produce barium sulfate. The barium sulfate can be left in the resole, since it is harmless, provided that it has a sufficiently small particle size so as not to impair handling of the resole, or it can be removed by filtration.

An improved resole composition, useful in the invention comprises an amino alkyl silane or silane hydrolysis product. In general, it has been found that any commercially available amino alkyl silane is highly advantageous in such a resin composition. Such silanes have the general formula:

$$R\text{—}Si\text{—}O\text{—}R'NH\text{—}n$$ 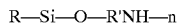

wherein R is an amino alkyl radical chemically bonded to the silicon atom, R' is an alkyl radical having from 1 to 4 carbon atoms, and n is an integer from 1 to 3, inclusive, optimum results have been achieved using a silane having the general formula:

$$NH_2C_2H_4NHC_3H_6Si(\text{——}OCH_3)_3$$ 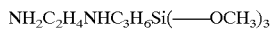

Excellent results have also been achieved using organo functional silanes such as gamma-amino-propyltriethoxy silane, glycidoxypropyltrimethoxy silane and 3-methacryloxypropyltrimethoxy silane. The preferred silane is 3-amino-propyltriethoxy silane, commercially available from OSi Specialties of Witco under the trade designation A1100. A preferred class of such silanes is one wherein R in the foregoing general formula has the formula $H_2N$—R" where R= is an alkylene radical having from 2 to 6 carbon atoms. Another such preferred class is one wherein R has the formula:

$$H_2N\text{—}R"\text{—}NH\text{—}R'"$$ 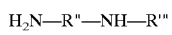

wherein R" and R'" are both alkylene radicals having from 2 to 6 carbon atoms.

Selection of the proper surfactant is very important in this resin application. The surfactant must have the proper wetting properties so that the resin will penetrate the polymeric pack. Some of the resin must penetrate to the center of the polymeric pack. However, having a layer near the surface that is resin-rich gives a smoother finish to the cured part. After application, the fiber and resin can be dried in a RF oven and stored until ready to mold into the finished product. During the cure cycle, the surfactant in the surface layer is decomposed by the cure heat. This gives a molded product with a hydrophobic surface. Water-based adhesives can therefore be applied to the surface of the molded fiber without the adhesive soaking or wicking into the interior of the molded article. This allows the use of much less adhesive when used to apply a finish or appearance coating to the molded article. Two surfactants which have the properties needed for this use are Aerosol OT-75 and polystep B-11. Aerosol OT-75 is a product of American Cyanidmide, Wayne, N.J. and is a dioctyl ester of sodium sulfosuccinic acid. Polystep B-11 is a product of Stepon Chemical Company, Northfield, Ill., and is ammonium lauryl ether sulfate. Both of these surfactants will be decomposed in the surface layer by the curing cycle used in this invention thereby giving a hydrophobic surface.

Various acid and base compounds can be used to control the pH of the resin solution to give it the desired stability. A wide range of resin to glass fiber weight ratios can be used to make useable products. These can vary from about 5 weight percent binder to more than 60 weight percent resin. The more useful range is from about 8 weight percent to about 45 weight percent binder in the molded product. The density of the molded product can also vary over a large range. Useful products can be as light as 1 pound per cubic food and as heavy as 45–50 pounds per cubic foot.

The resin may also contain hydrocarbon polymers such as latex. The addition of latexes is useful for applications requiring increased elasticity. For example, in applications where the molding media is folded, it is useful to add elasticity so as to avoid creasing problems.

Once the resin is selected, it is then dispensed through an apparatus that will foam the resin. Any such apparatus may be used as long as the resin is foamed. In a preferred embodiment, the apparatus used to foam the resin is the one described in U.S. Pat. No. 4,570,859 assigned to Owens Corning, incorporated by reference herein. In particular, the apparatus used is as shown in FIGS. 1–3.

Figure 2:
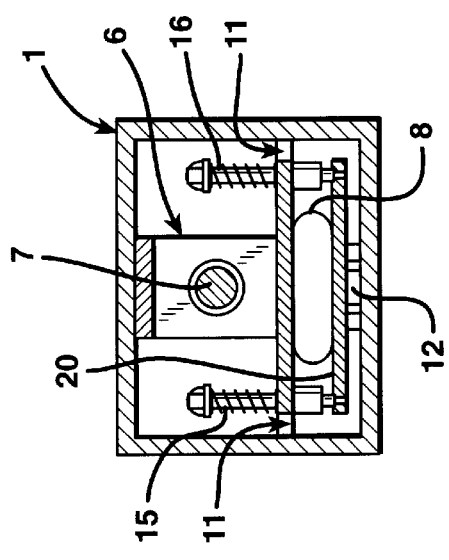
FIG. 2 is a cross section taken through section 2—2 of FIG. 1.
Figure 3:
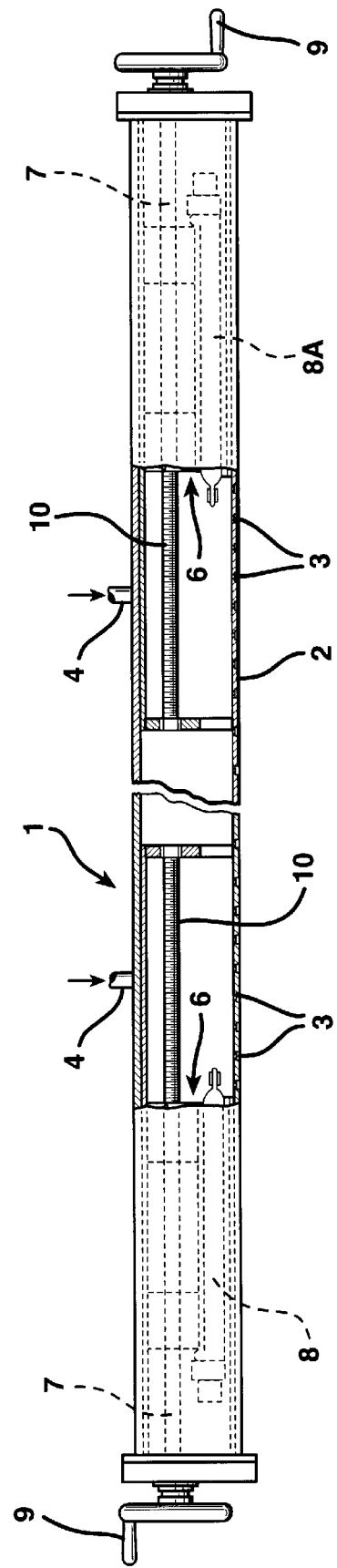
FIG. 3 is a representation of a second embodiment of the dispenser of FIG. 1.

FIGS. 1 and 2 show a chamber or dispensing head 1, having an apertured dispensing wall 2, apertures 3, being positioned therein. The dispensing head is adapted with conduit 4 opening thereunto for the introduction of the material or resin to be dispensed through the apertures.

Positioned within the head is carrier 6 comprising a support shaft 7 on which the expandable member 8 is carried in any suitable manner. The expandable member is positioned along the length of the head by means of crank 9 which acts to move the carrier along threaded shaft 10. The expandable member is carried, for example, on side track and supports 11 and is expandable downward therebetween. Positioned between the expandable member and the apertures can be resilient member or gasket, 12. Upon expansion of the expandable member downward by the introduction of a fluid through inlet 13 and hose 14, a compressible member such as a gasket 12 is forced against the outlet apertures to substantially limit flow therethrough from the head to any desired rate, including total shut-off.

Affixed to the gasket is plate 20 which, in turn, is carried on springs 15 and 16. Upon inflation of the expandable member, these springs are placed in compression as the gasket and plate move against the apertures. Upon deflation of the expandable member, the expandable member moves away from the apertures, and the springs relax such that the plate moves upwardly carrying the gasket with it to open flow through the apertures from the dispenser.

Referring to FIG. 3, there is shown a plurality of expandable members 8 and 8A carried on a common, but extended, carrier 6. The second expandable member 8A, is adapted in a manner similar to that of a single carrier of FIG. 1 with the total length of the carrier being less than, equal to, of the width of the dispenser, thus enabling the carrier to be positioned at any point along the width of the head. If desired, a second and independent fluid inlet can be affixed to each expandable member to inflate the members independently of each other and provision can be supplied to move the members individually along the longitudinal axis of the dispenser.

In addition, the chamber can be departmentalized such that from each compartment is dispensed a different material, the expandable member being arbitrarily positioned in each compartment. Any suitable expandable member can be employed in this invention. One example of a preferred embodiment is a pressure power unit termed the "Windjammer" available from Merriman Products, Inc., Jackson. Mich. The expandable member will not be of such a size as to limit flow of the dispenser through the dispensing head. The above discussion regarding the dispenser of a foamed resin is taken from U.S. Pat. No. 4,956,409, assigned to Owens Corning, herein incorporated by reference.

The resin is then dispersed as a foam throughout the fiber. A preferred embodiment uses an apparatus for impregnating a fibrous web such as disclosed in U.S. Pat. No. 4,288,475, incorporated by reference herein. (The following discussion of the apparatus for impregnating a fibrous web is taken from U.S. Pat. No. 4,288,475.) A conveyor is provided for advancing a fibrous web or mat having a first and a second surface. An applicator is provided for applying a foamed resin to the first surface of the fibrous web and the resin seals the first surface of the web. A vacuum chamber is positioned adjacent to the second surface of the web. The vacuum chamber contains a narrow slot adjacent to the second surface of the web for applying a vacuum to the web. The vacuum acts upon the web to reduce the thickness of the web and to draw the foamed binder into the web to impregnate the web. The specific features of the process will be more fully understood by referring to the attached drawings in connection with the following description.

Figure 4:
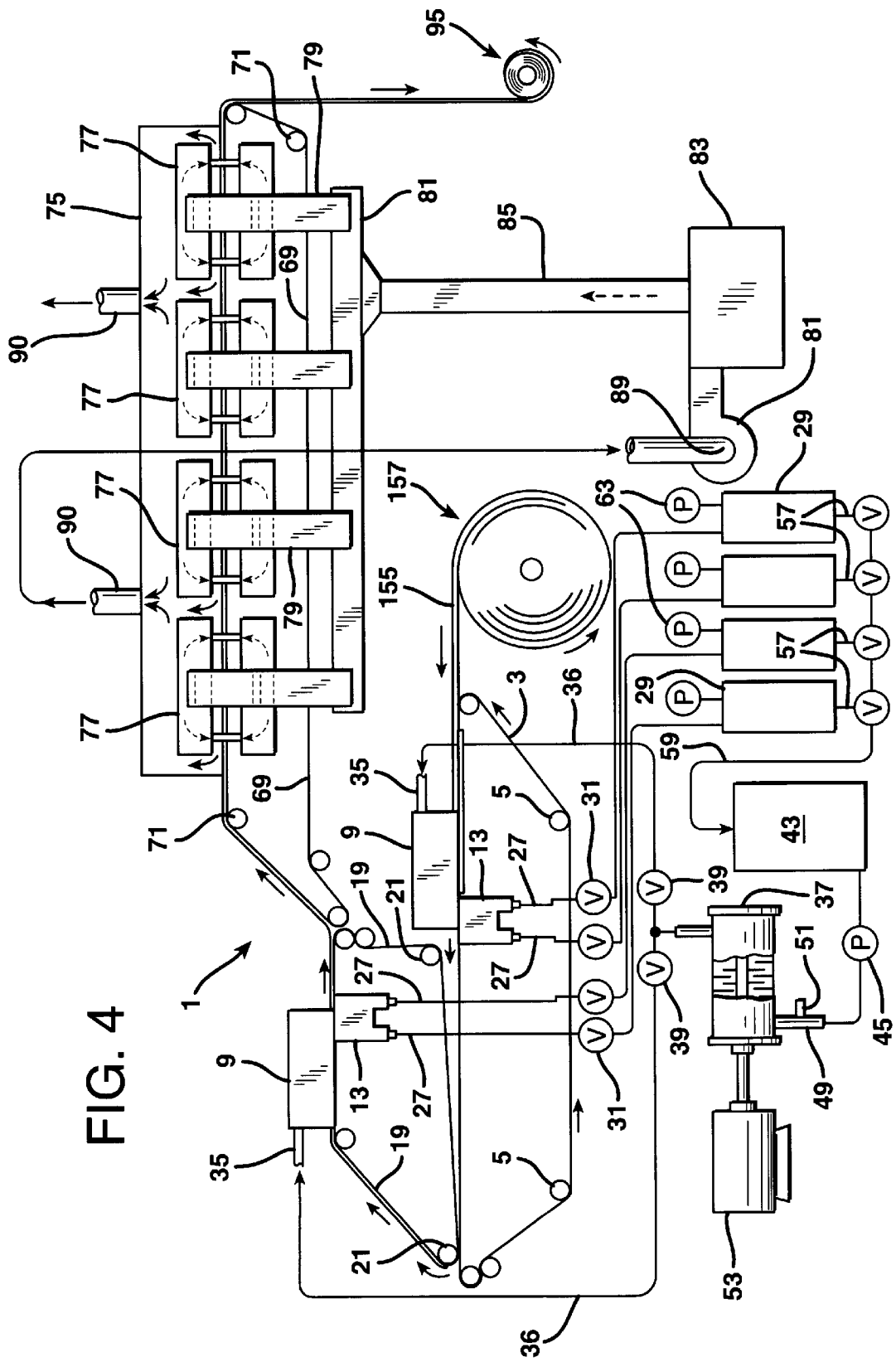
FIG. 4 is a side elevation view of the method and apparatus for impregnating a fibrous web.

FIG. 4 shows an embodiment of an impregnator 1 of this invention. The impregnator contains a first porous of foraminous conveyor 3 for conveying the fibrous material that is to be impregnated. The conveyor can be constructed of a woven or mesh type belt provided the belt is porous. The conveyor is supported and advanced by rollers 5 in a manner well known in the art. Positioned adjacent to one side of the first conveyor 3 is a foam applicator 9. The foam applicator 9 is positioned adjacent the side of the first conveyor upon which the material to be impregnated is positioned. The foam applicator 9 is positioned with respect to the conveyor so that the material to be impregnated can pass beneath the foam applicator as it is advanced by the first conveyor 3. Positioned on the opposite side of the first conveyor 3 from the foam applicator 9 is a vacuum chamber 13. The vacuum chamber 13 is positioned adjacent to the side of the first conveyor 3 that is opposite to the side of the conveyor that is used to convey the material to be impregnated. The vacuum chamber is positioned with respect to the first conveyor 3 so that the vacuum chamber is substantially opposite to the foam applicator 9.

At the discharge end of the first conveyor 3 there is positioned a second porous of foraminous conveyor 19. The second conveyor 19 is supported and driven by rollers 21 in a manner which is well known in the art. The second conveyor 19 is positioned with respect to the first conveyor 3 so that the material to be impregnated advances onto the second conveyor. As the material advances onto the second conveyor the surface of the material that was spaced apart from the first conveyor 3 will be positioned on the surface of the second conveyor 19. The surface of the material that was in contact with the surface of the first conveyor 3 will now be spaced apart from the surface of the second conveyor 19. In other words, the fibrous material is reversed with respect to the surface of the conveyor as the fibrous material advances onto the second conveyor 19.

The foam applicator 9 is positioned adjacent the surface of the second conveyor 19 upon which the material to be impregnated is positioned. The foam applicator 9 is positioned with respect to the second conveyor 19 in substantially the same manner the foam applicator 9 was positioned with respect to the first conveyor 3. Positioned on the opposite side of the second conveyor 19 from the foam applicator 9 is a vacuum chamber 13. The vacuum chamber 13 is positioned in substantially the same manner as the vacuum chamber 13 was positioned with respect to the first conveyor 3.

The foam applicators 9, associated with the first and second conveyors, contain an inlet pipe 35 that is connected to a foaming head 37 by a conduit 36. The foaming head foams the resin and supplies the foamed resin to the foam applicators 9. Valves 39 can be positioned between the foam applicators 9 and the foaming head 37 for controlling the supply of foamed resin to the foam applicators. The resin for the foaming head 37 is supplied from a mix tank 43. A pump 45 is used to supply the resin from the mix tank 43 to the foaming head 37. The resin material enters the foaming head through an inlet pipe 49. The inlet pipe 49 also contains an air inlet 51 through which air can be supplied to the resin that is being pumped to the foaming head 37. A motor 53 is provided for operating the foaming head 37.

The vacuum chambers 13, associated with the first and second conveyors, contain two vacuum chambers and each chamber is connected by a vacuum line 27 to a vacuum and storage chamber 29. A valve 31 can be positioned between the vacuum chamber 13 and the vacuum and storage chamber 29 to control the supply of vacuum to the chambers 13. The combination vacuum and storage chambers 29 contain discharge openings 56 and the discharge openings 57 are connected by conduit 59 to the mix tank 43. The combination vacuum and storage chambers 29 each have a pump 63 for discharging material from the chamber 29 through the discharge opening 57.

Positioned adjacent the second conveyor 19 is a third porous or foraminous conveyor 69. The third conveyor 69 is supported upon and is driven by rollers 71 in a manner that is well known in the art. The third conveyor 69 passes through a drying oven 75. The drying oven contains drying chambers 77 that are positioned on each side of the third conveyor 69. The drying chambers 77 are connected to a supply conduit 79 and the supply conduits are connected to a header 81. The header 81 is connected to a furnace 83 by a distribution duct 85. The furnace 83 can contain a blower 87 having an inlet opening 89. The drying oven 75 contains exhaust openings 90 through which the exhaust from the drying oven is discharged. The exhaust openings 90 can be connected to the inlet opening 89 for the blower 87.

Positioned at the end of the third conveyor 69 is a collection station 95 for collecting the fibrous material that has been impregnated on the impregnator 1. The collection station 95 can comprise a collet or spindle upon which the fibrous material may be wound into a package.

Figure 5:
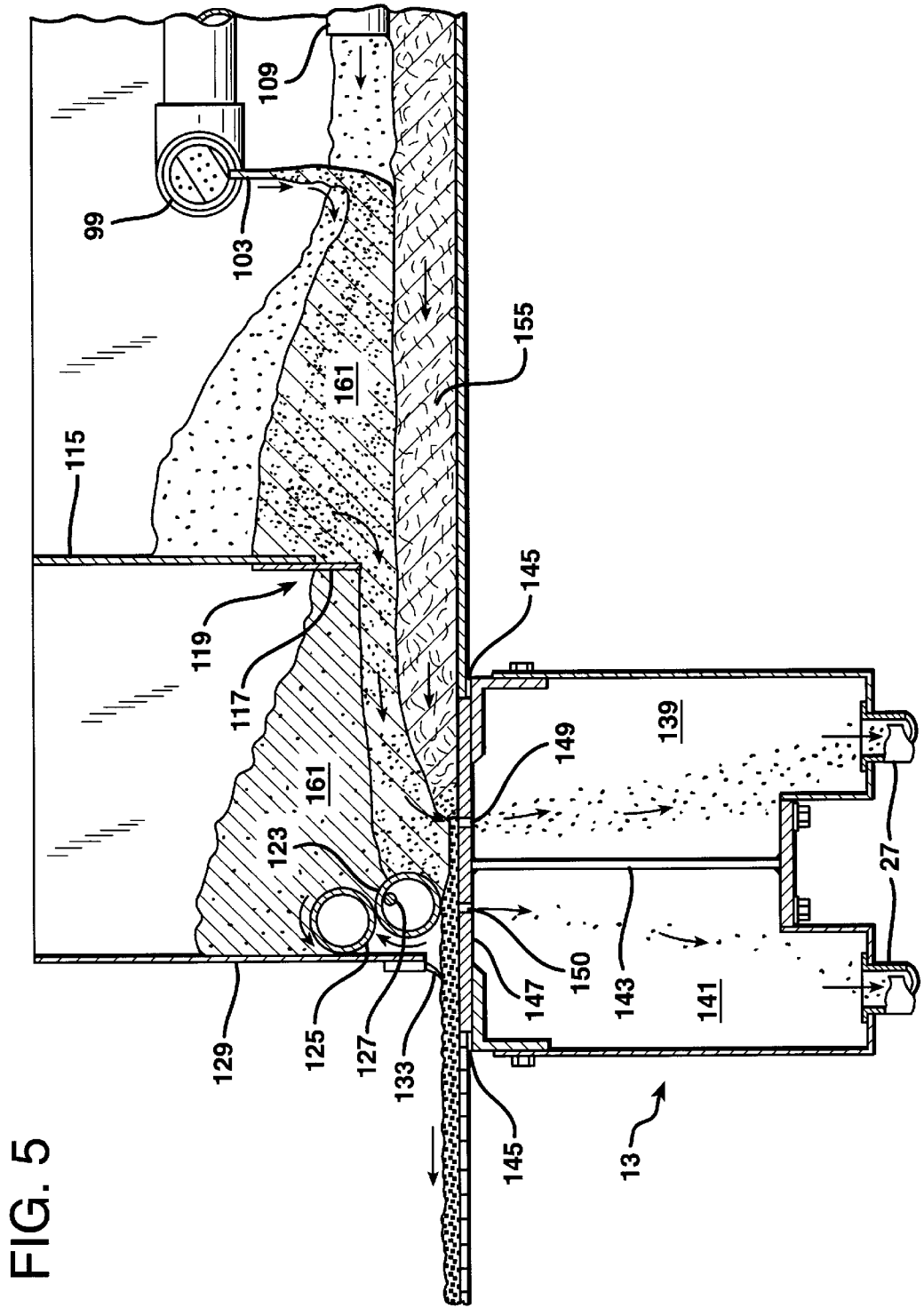
FIG. 5 is a partial side cross-sectional view of the apparatus of FIG. 4.
Figure 6:
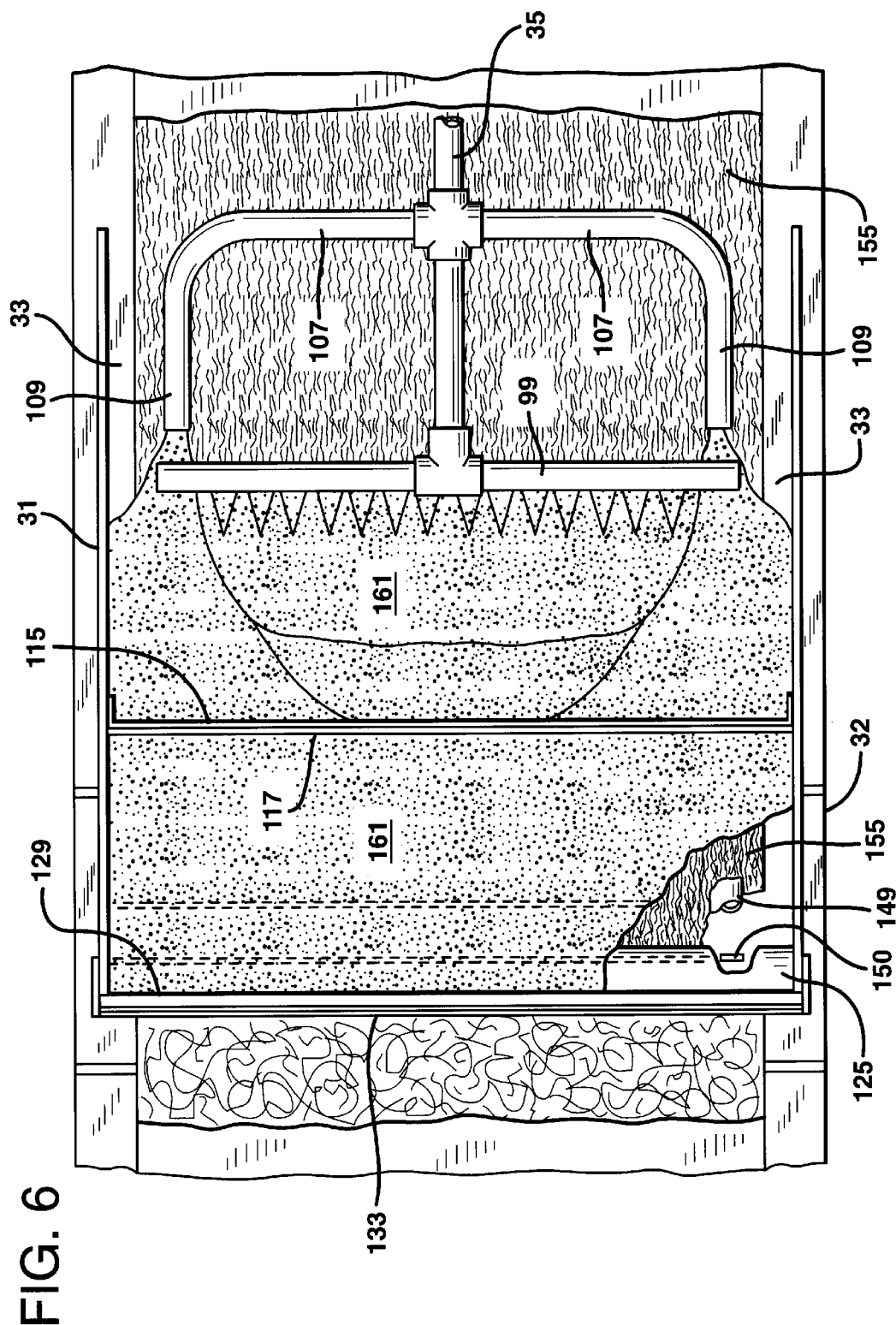
FIG. 6 is a partial plan view of the apparatus of FIG. 4.

The details of the foam applicators 9 and vacuum chambers 13 will be more fully understood by referring to FIGS. 5 and 6. The foam applicator has two side walls that are substantially parallel to the direction of travel or advancement of the conveyor, two end walls that are substantially perpendicular to the direction of advancement of the conveyor and a top wall that is substantially parallel to the surface of the conveyor upon which the material to be impregnated is positioned. However, the bottom area of the Almost any resin material that can be foamed or air-diluted can be used with the foam applicator 9. Usually aqueous based resinous resins such as acrylics, phenolics, vinyls, urea and polyethelene are used to impregnate the fibrous material. However, it should be noted that other thermoplastic and thermoset resins having either an aqueous or foam applicator, i.e., the portion of the foam applicator that is positioned adjacent to the surface of the conveyor, is open. Thus, the foam applicator 9 defines a chamber that is open on one side and the open side of the chamber is adjacent the conveyor and the fibrous material to be impregnated. The end walls of the foam applicators are positioned so that they terminate above the surface of the conveyor. Sufficient space is provided between the surface of the conveyor and the end walls of the foam applicator to allow the fibrous material to advance on the conveyor beneath the foam applicator. The sidewalls 32 of the foam applicator extend down to the surface of the conveyor, also, as shown in FIG. 6, the sidewalls 32 are spaced apart from the edges of the fibrous material. A space 33 is defined between the sidewalls 32 and the edge of the fibrous material.

The foam inlet pipe 35 extends into the foam applicator and terminates in a header 99. The header 99 is disposed substantially perpendicular to the direction of advancement of the conveyor and the header 99 extends substantially across the width of the conveyor. The header 99 contains a plurality of orifices 103. The orifices 103 are substantially equally spaced along the header and extend substantially along the entire length of the header. The orifices 103 are positioned in the portion of the header 99 that is closest to the surface of the conveyor and the material to be impregnated. The direction of discharge from the orifices 103 is towards the surfaces of the conveyor and substantially perpendicular to the direction of advancement of the conveyor. The foam discharge header 99 and the orifice 103 are disposed in the foam applicator 9 so that they are in spaced apart relationship with the conveyor and the material to be impregnated.

The foam inlet pipe 35 is also connected to conduits 107. Conduits 107 terminate in discharge nozzles 109. The discharge nozzles 109 are oriented to discharge material in a direction that is substantially parallel to the direction of advancement of the conveyor. The discharge nozzles 109 are disposed approximately at the ends of the discharge header 99. There is a discharge nozzle 109 at each end of the header 99. The discharge nozzles 109 are also positioned in close proximity to the edges of the conveyor. The discharge nozzles 109 are positioned between the header 99 and the surface of the material to be impregnated. In fact, the discharge nozzles 109 are disposed in close proximate relationship to the surface of the material to be impregnated. As shown in FIG. 5 the discharge nozzles 109 can be positioned to discharge material onto the advancing fibrous material before the orifices 103 in the header 99 discharges material onto the advancing fibrous material.

Positioned downstream from the header 99 and discharge nozzles 109 is a foam spreader 115. The foam spreader is disposed substantially perpendicular to the direction of the advancement of the conveyor and the spreader extends from sidewall to sidewall of the foam applicator 9. The foam spreader 115 normally terminates so that it is in spaced apart relationship with the conveyor and the fibrous material to be impregnated. The portion of the foam spreader 115 that is in closest proximity to the conveyor and fibrous material contains an adjustable blade 117. The adjustable blade 117 is adjustably secured to the spreader 115 by the securement means 119. The securement means 119 adjustably secures the blade 117 so that the blade can be adjusted in a direction which is substantially perpendicular to the direction of the advancement of the conveyor. Movement of the blade 117 adjusts the distance between the surface of the conveyor and the blade 117.

Positioned downstream from the foam spreader is a first roller 123 and a second roller 125. The first roller 123 is rotatably positioned on rod 127. The rod 127 is positioned in the foam applicator 9 so that the first roller 123 will be in contact with the surface of the material that is to be impregnated as the first roller 123 rotates. The second roller 125 is rotatably positioned so that it rests upon the surface of the first roller 123 that is spaced apart from the surface of the conveyor and the end wall 129 of the foam applicator 9. The first and second rollers are positioned so that their longitudinal axes are substantially perpendicular to the direction of advancement of the conveyor. The first and second roller also extend substantially across the entire width of the conveyor. The first roller 123 is free to move on the rod 127 in a direction that is perpendicular to the surface of the conveyor. Thus, the first roller is free to remove with respect to the surface of the conveyor. As the second roller 125 is positioned on the first roller, the second roller will move with any movement of the first roller.

The end wall 129 of the foam applicator 9 terminates at a position that is spaced apart from the fibrous material that is being advanced on the conveyor. A squeegy 133 is positioned on the end wall 129 and extends down to the upper surface of the fibrous material. The squeegy is normally constructed on a resilient or pliable material that can bend or deflect as the fibrous material advances.

Positioned on the opposite side of the conveyor from the foam applicator 9 is a vacuum chamber 13. The vacuum chamber 13 contains a first chamber 139 and a second chamber 141. The first and second chambers are separated by a wall 143. Thus, there are two separate chambers within the vacuum chamber 13. The vacuum chamber 13 is connected to plate 147 and plate 147 is positioned immediately adjacent the conveyor. The plate 147 and vacuum chamber 13 extend substantially across the width of the conveyor. On each side of the plate 147 the conveyor is supported by members 144. The members 144 extend substantially across the width of the conveyor. A seal 145 is positioned between the plate 147 and the members 144. The seals are positioned to prevent the flow of air between the plate 147 and the members 144. Located in the plate 147 are slot 149 and slot 150. The slots pass through the plate 147 and place the interior of vacuum chamber 13 in communication with the underside of the conveyor. Slot 149 is positioned so that it is in communication with the first chamber 139 and slot 150 is in communication with the second chamber 143 in the vacuum chamber 13. The slots 149 and 150 extend substantially across the width of the conveyor and the longitudinal axes of the slots are substantially parallel and substantially perpendicular to the direction of advancement of the conveyor. The slots are usually relatively narrow, having a width of about 0.02 to about 0.125 of an inch. However, it has been found in practice that slots having a width of about 0.040 to about 0.050 of an inch will normally work satisfactorily in impregnating fibrous material. The slots are positioned in the plate so that there is a space of about 0.25 of an inch to about 2 inches between the slots. The vacuum chamber 13 and plate 147 are disposed with respect to the conveyor so that the slots are positioned on the opposite side of the conveyor from the foam applicator 9. The slot 150 is positioned substantially beneath the first roller 123 in the foam applicator 9. A vacuum line 27 extends from the first chamber 139 and the second chamber 141 for connecting these chambers to a source of vacuum.

The operation of the impregnator will be more fully understood by referring to FIGS. 4, 5 and 6. Fibrous material 155 is advanced from a distribution station 157 onto the first porous or foraminous conveyor 3. The fibrous material can contain some resin material to hold the fibrous material in the form of a web or mat. The advancement of the conveyor 3 acts to advance the fibrous material so that it moves along the advancing conveyor. The fibrous material passes under the foam applicator 9. The foam applicator is positioned in spaced apart relationship with one side of the conveyor 3 so that the fibrous material is free to pass beneath the foam applicator.

In the foam applicator 9 a foam resin material 161 is applied to the surface of the fibrous material. The resinous material is foamed or air diluted in the foaming head 37 prior to being applied to the fibrous materials. During the foaming process air bubbles are entrained into the resin to cause the resin to foam. The foaming process, therefore, produces a resin having a cellular structure with the bubbles forming the cells in the resin. The foamed resin material is applied to the fibrous material through the orifices 103 in the header 99 and the discharge nozzle 109 located on the ends of conduits 107. A sufficient quantity of foam resin material supplied to the surface of the fibrous material to insure that the entire surface of this fibrous material is coated. The discharge nozzles 109 are positioned substantially along the sides of the conveyor and the material to be impregnated. Accordingly, more foamed resin is applied along the edges of the fibrous material as the material advance through the foam applicator 9. A portion of the resin material will be deposited in the space 33 between the sidewalls 32 of the foam applicator and the edges of the fibrous material. The foamed resin deposited in the space 33 will act to seal the edges of the fibrous material. FIGS. 2 and 3 show how additional foamed resin is applied at the edges of the fibrous material by the nozzles 109.

In most applications more foamed resin material is applied to the fibrous material than is actually required to impregnate the fibrous material. Accordingly, a foam spreader 115 is positioned in the foam applicator 9 and the foam spreader has an adjustable blade 117 positioned in adjacent spaced apart relationship to the surface of the fibrous material. The foam spreader 115 acts to distribute the foam across the entire width of the fibrous material so that there will be an adequate distribution of foamed resin on the entire surface of the fibrous material. The adjustable blade 117 is positioned to allow a measured amount of foamed resin material to pass under the foam spreader and to advance with the fibrous material. Thus, the foam spreader and adjustable blade act to apply a measured amount of foamed resin material to the surface of the fibrous material.

As the fibrous material advances along the conveyor 3 the fibrous material comes under the influence of the vacuum chamber 13. The slot 149 in plate 147 communicates with first chamber 139 in the vacuum chamber 13. The first chamber 139 is connected to a source of vacuum through vacuum line 27. Accordingly, a zone of reduced pressure is created along the slot 149 which communicates with the first chamber 139. The conveyor 3 advancing above the slots 149 is porous so that the affect of the reduced pressure, created by the slot 149, passes through the porous conveyor. The reduced pressure acts upon the fibrous material and causes it to compress or be drawn towards the slot 149 as the fibrous material advances over the slot 149. The fibrous material is compressed by the reduced pressure because the foamed resin material on the surface of the fibrous material seals the upper surface and edges of the fibrous material. As the fibrous material is sealed by the resin, the reduced pressure acts upon the fibrous material and draws it towards the slot 149. Accordingly, the reduced pressure in the first chamber 139 compresses the fibrous material. In practice, it has been found that the fibrous material will be reduced to about ¾ to about ¹⁄₁₀ of its original thickness as it passes over the slot 149 that communicates with the first chamber. The reduction in thickness of the fibrous material is primarily a function of the thickness of the material, the density of the material and the strength of the reduced pressure. However, it should be noted that if a very thin material is being impregnated that there may be very little compression of the fibrous material as it advances past the slot 149.

The zone of reduced pressure created by slot 149 also causes the foamed resin material 161 to be drawn into the fibrous material to impregnate the fibrous material. In fact, a portion of the foamed resin material 161 can be drawn through the fibrous material, through the porous conveyor, through the slot 149 and into the first chamber 139. After passing the slot 149 which is in communication with the first chamber 139 the fibrous material is substantially impregnated with the foamed resin material 161.

When the fibrous material is compressed or reduced in thickness, the fibrous material becomes more uniform with respect to the resistance of flow of a fluid through the fibrous material. Accordingly, the foamed resin material will be drawn through a more uniform fibrous material and the impregnation of the fibrous material will be more uniform as a result of the compression of the fibrous material. In practice, it has been found that most fibrous materials will have to be compressed to at least ½ of their original thickness to significantly improve the resistance to flow of a fluid through the fibrous material. The degree of compression of the fibrous material can be controlled by controlling the strength of the vacuum or reduced pressure in the vacuum chamber 13. The vacuum can be controlled by adjusting the valve 31 between the vacuum chamber 13 and the vacuum and storage chamber 29. By controlling the level of vacuum in vacuum chamber 13 to be compatible with the fibrous material and foamed resin being used, the impregnation of the fibrous material can be optimized.

The fibrous material then passes over a second zone of reduced pressure which is created by slot 150 which is in communication with the second chamber 141 of the vacuum chamber 13. The second zone of reduced pressure acts to hold the fibrous material in its state of reduced thickness and draws additional foamed resin material to the interior of the fibrous material. The zone of reduce pressure created by slot 150 can also act to compress the fibrous material as the fibrous material advances past the slot.

However, any such additional compression will usually be very slight. In fact, portions of the foamed resin material may pass through the fibrous material, through the porous conveyor, through the slot 150 and into the interior of the second chamber 141. As the fibrous material advances past the slot 150 the fibrous material is usually completely impregnated with the foamed resin.

The slot 150 and zone of reduced pressure created by the slot, may not be necessary to draw additional foamed resin material into the fibrous material. The fibrous material may be completely impregnated after advancing over the zone of reduced pressure created by slot 149. However, the slot 150 is available to supply an additional zone of reduced pressure if such an additional zone is required to complete the impregnation of the fibrous material. However, the zone of reduced pressure created by slot 150 does provide an additional important function in that it helps to maintain the fibrous material in contact with the conveyor. When the fibrous material is held against the conveyor, a seal between the fibrous material and conveyor is created. The seal acts to prevent air from being drawn into the slots 149 and 150 from the environment around the foam applicator 9 and vacuum chamber 13. In addition, the seals between the vacuum chamber 13 and the members supporting the conveyor also act to prevent air from the environment around the foam applicator and vacuum chamber from being drawn into the slots 149 and 150. When air is not drawn between the fibrous material and conveyor, the zone of reduced pressure from slot 149 is more effective in compressing the fibrous material and in drawing foamed resin into the fibrous material. Thus, the slot 150 will normally be connected to a source of reduced pressure to help hold the fibrous material against the conveyor even if the slot 150 is not required to further impregnate the fibrous material with the foamed resin. The valve 31 can be used to adjust the strength of the reduced pressure connected to slot 150 depending on whether the reduced pressure is being used to further impregnate the fibrous material or to hold the fibrous material against the surface of the conveyor.

Figure 8:
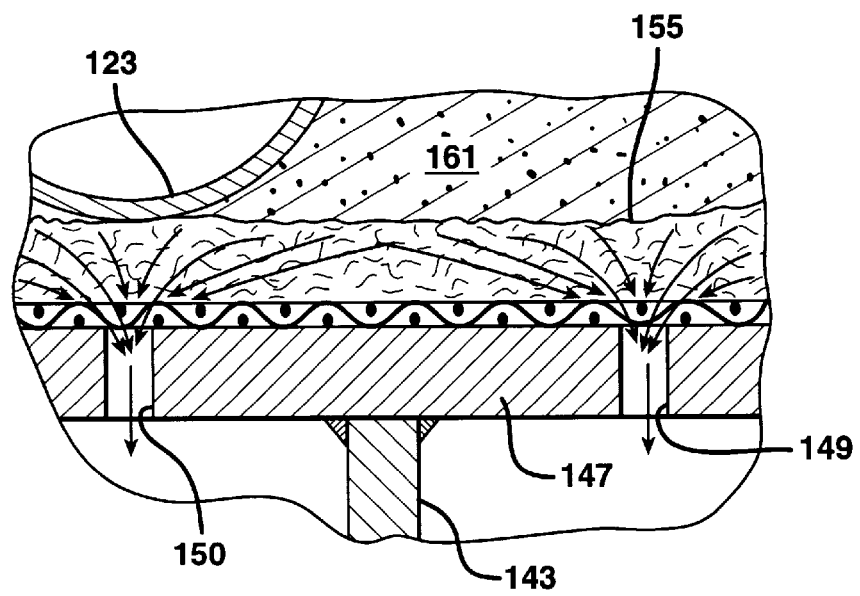
FIG. 8 is a partial side elevation view of the fibrous material being impregnated.

When the fibrous material passes over slots 149 and 150 the zone of reduced pressure from the slots diverges, as shown in FIG. 8, as it acts upon the fibrous material. The effect of the zone of reduced pressure fans out from the slot and acts upon a wider area of the fibrous material. In constructing the vacuum chamber 13 it is important that the slots 149 and 150 be positioned so that the diverging effect of the reduced pressure from the slots will overlap in the fibrous material. By having the effect of the zones of reduced pressure from slots 149 and 150 overlap the fibrous material will continually be under the influence of the reduced pressure as the fibrous material passes over the slots 149 and 150. Accordingly, the fibrous material will be held against the conveyor by the overlapping effect of the reduced pressure, a good seal will exist between the fibrous material and the conveyor and the reduced pressure from slots 149 and 150 will be more effective in impregnating the fibrous material.

The zones of reduced pressure created by slots 149 and 150 must be sufficiently strong to create a pressure differential in the fibrous material that will draw the foamed resin material into the fibrous material. The widths of the slots 149 and 150 can be set so that there will be a sufficient pressure differential created by the slots. Generally, the narrower the slot, the greater the pressure differential that will be created by the slots. In addition, valves 31 can be adjusted to control the strength of the vacuum supplied to the slots 149 and 150.

Positioned above the slot 150 is the first roller 123 and the second roller 125. The first and second rollers are positioned in the foam applicator to keep excess foamed resin material from remaining on the surface of the fibrous material after the fibrous material passes the slot 150. The first roller 123 is mounted on the rod 127 so that the roller 123 is free to move in a direction perpendicular to the surface of the fibrous material. Therefore, if there is a bump or depression in the fibrous material the first roller 123 can move to stay in contact with the surface of the fibrous material. The movement of the first roller 123 keeps the roller from being damaged and keeps the roller from damaging the fibrous material if there is a lump or other problem in the fibrous materials.

As the impregnated fibrous material advances along the conveyors from the foam applicator 13 there is a squeegy 133 which is positioned on the end wall 129 of the foam applicator. The squeegy 133 is constructed of a resilient material and the end of the squeegy is in contact with the surface of the fibrous material. The squeegy is positioned at the end of the foam applicator to remove any excess foamed resin that may remain on the surface of the fibrous material after the fibrous material has passed through the foam applicator.

After passing through the foam applicator 9 and vacuum chamber 13 associated with the first conveyor 3 the impregnated fibrous material advances along the first conveyor until it comes into contact with the second conveyor 19. The impregnated fibrous material then is transferred to the second porous conveyor 19. The second conveyor 19 is positioned so that surface of the impregnated fibrous material that was spaced apart from the surface of the first conveyor 3 will be in contact with the surface of the second conveyor 19. And the surface of the impregnated fibrous material that was in contact with the surface of the first conveyor 3 will now be spaced apart from the surface of the second conveyor 19. The impregnated fibrous material advances along the second conveyor 19 until it comes in contact with a foam applicator 9 and a vacuum chamber 13 which are substantially similar in position and operation to the foam applicator 9 and the vacuum chamber 13 associated with the first conveyor 3. As the impregnated fibrous material passes between the foam applicator 9 and vacuum chamber 13 associated with the second conveyor 19, foamed resin material can again be applied to the fibrous material. The application of the foam resin material and the impregnation of the fibrous material will be substantially the same as the process described in connection with the first conveyor 3. However, the foamed resin material will be drawn into the fibrous material in the opposite direction to that shown in respect to first conveyor 3. By changing the direction of impregnation of the fibrous material the uniformity of the impregnation will be improved. The second impregnation step shown in connection with the second conveyor 19 may not be required in the impregnation of all fibrous materials. In fact, the numbers of foam applicators and vacuum chambers associated with the impregnation process can be varied to achieve the desired level of impregnation for the fibrous material and foamed resin being used.

The first chamber 139 and second chamber 141 of the vacuum chambers 13 are connected to a vacuum and storage chamber 29 by means of vacuum line 27. It should be noted that the first chamber 139 and second chamber 141 of each vacuum chamber 13 is connected to a separate vacuum and storage chamber by a separate vacuum line 27. The vacuum and storage chambers 29 supply the source of negative pressure or vacuum for the vacuum chamber 13. This source of vacuum is supplied to the vacuum chamber 13 by vacuum line 27. The chambers 29 are, however, also storage chambers. When the fibrous material is subjected to the reduced pressure or vacuum of the first chamber 139 or second chamber 141 the reduced pressure causes the foamed resin to move into the fibrous material and impregnate the fibrous material. As previously described some of the foamed resin material may pass through the fibrous material and be drawn into the first or second chambers of the vacuum chamber 13. The foamed resin is drawn through the first and second chambers and into vacuum line 27 by the reduced pressure or vacuum created in the combination vacuum and storage chambers 29. Thus, the foamed resin material that is drawn into the vacuum chamber 13 passes through vacuum line 27 and into the combination vacuum and storage chambers 29. In the chamber 29 the resin material is separated out and positioned in a storage area in the chamber. The collected resin material can then be discharged through discharge openings 57 in the chambers 29 into conduit 59 which empties into the mix tank 43. The resin material is discharged from the chambers 29 by pumps 63 which are connected to each of the individual vacuum and storage chambers. A valve can be fitted between the discharge opening 57 and the conduit 59 to control the flow of the resin from the discharge and storage chambers 29 to the mix tank 43. In this fashion the resin that passes through the fibrous material and into the vacuum chamber 13 can be collected in the chambers 29 and then recycled into the mix tank 43 for reuse in impregnating the fibrous material.

In the mix tank 43 the resin material collected in the chambers 29 is mixed with new resin material. The mixture of resin material in tank 43 is pumped through a conduit 49 by pump 45 into a foaming head 37. Air can be introduced into the conduit 49 and into the resin through air inlet 51. The air inlet connects to the conduit 49 at a point in close proximity to where the conduit enters the foaming head. In the foaming head 37 the combination of the resin material and air is foamed. A suitable motor 53 is provided for driving the foaming head 37. The foamed resin material is supplied to the foam applicator by a conduit 35. Valve 39 can be positioned between the foaming head and the foam applicators to control the flow of the foam resin to the foam applicators.

The foamed resin is particularly well suited for impregnating a web of fibrous material because of the bubbles or cells formed in the resin during foaming. The bubbles become trapped or caught in the interstice between the fibers of the fibrous material. The trapping of the bubbles allows a higher percentage of resin to be retained in the fibrous material. Using a foamed resin it has been found that up to about 50% to about 60% by weight of the impregnated fibrous material can be comprised of resin. However, in practice it has been found that it is usually only necessary to apply about 8% to about 45% by weight of resin material to the fibrous material. In a preferred embodiment the resin material is about 8% to about 35% by weight of resin to the fibrous material.

From the second conveyor 19, the impregnated fibrous material advances to the third conveyor 69. As the impregnated fibrous material advances along the third conveyor 69 it passes into a drying oven 75. The drying oven 75 has a plurality of drying chambers 77 positioned therein. The drying chambers are constructed so that there is a chamber on each side of the third conveyor 79. The drying chambers are connected to a supply conduit 79 and the supply conduit is connected to a header 81. The header 81 is connected to a furnace 83 by a distribution duct 85. A blower 87 is connected to the furnace 83 for forcing hot air or other heated gaseous material up the distribution duct 85 into the header 81 through the supply conduit 79 and into the drying chamber 77. The drying chambers 77 are arranged so that the heated air or gaseous material will pass through the impregnated fibrous material to dry the foam resin. In drying the foam resin the heated air or gaseous material removes the aqueous or liquid portion of the foam resin and leaves the solid resin in position within the fibrous material. Exhaust openings 90 are provided in the drying oven 75 through which exhaust gases can be removed from the drying oven. The exhaust gases removed through the exhaust openings 90 can be recirculated so that they flow back to the blower 87 which is associated with the furnace 83. In this manner the hot exhaust gases from the drying oven 75 can be recirculated through the furnace and reused to dry the impregnated fibrous material. The bubble or cell structure of the foamed resin increases the surface area of the aqueous or liquid portion of the resin. Accordingly, there is more surface area of the aqueous or liquid material that will be contacted by the heated drying fluid. The increased surface area allows the aqueous or liquid portion to be removed from the resinous material using less energy. The drying oven 75 removes the aqueous or liquid portion of the resin material and leaves the solid resin material in the fibrous web. Therefore, when the impregnated fibrous material leaves the drying oven 75 it is impregnated with a dried resin material.

As the aqueous portion of the foamed resin is being removed in the drying oven 75 the fibrous material begins to recover its original thickness. The fibrous material begins to expand because the dryer resin material does not have as much weight or adhesive force to hold the fibrous material in a compressed state When substantially all of the aqueous material has been removed from the resin by the drying oven the fibrous material will have recovered substantially its original thickness. Therefore, the drying oven 75 restores the fibrous material to substantially its full thickness. It should be noted that the drying oven 75 only removes the aqueous or liquid material from the resin and that the resin is not being cured in the drying oven.

After the fibrous material has been impregnated, dried and collected, the fibrous material can be further processed to form finished products. As is discussed in more detail below, the impregnated fibrous material can be cut to size, molded to change its contour and further heated to cure the resin on the fibrous material. Curing the resin will cause the resin material to become rigid and to hold the fibrous material in a desired shape or form.

Figure 7:
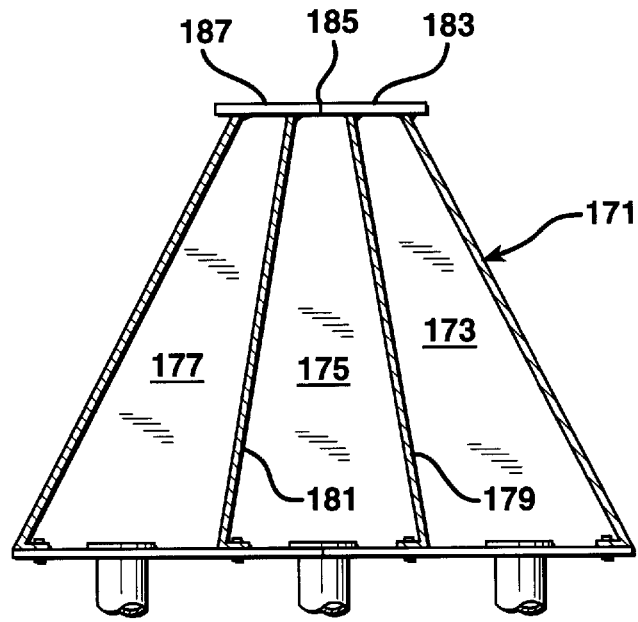
FIG. 7 is a side elevation view of an alternative embodiment of the apparatus of FIG. 4.

FIG. 7 shows another embodiment for a vacuum chamber that can be used with the present invention. A vacuum chamber 171 is shown that has a first chamber 173, a second chamber 175 and a third chamber 177. The three chambers are separated by wall 179 and wall 181. The first chamber 173 contains a slot 183 in the top wall of the chamber. The second chamber 175 contains a slot 185 in the top wall of the chamber. The third chamber 177 contains a slot 187 in the top wall of the chamber. The vacuum chamber 171 is positioned in substantially the same manner and operates in substantially the same manner as the previously described vacuum chamber 13. However, in vacuum chamber 171, there is an additional chamber and slot for applying a zone of reduced pressure to a fibrous material to be impregnated.

The additional chamber and slot used in vacuum chamber 171 allows a zone of reduced pressure to be placed over a wider area of the fibrous material to be impregnated. The larger zone of reduced pressure allows more foamed resin material to be drawn into the fibrous material as the fibrous material passes over the vacuum chamber 171. Thus, more complete impregnation will occur as the fibrous material is passed over the vacuum chamber 171 or the fibrous material can be advanced at a higher rate of speed over the vacuum chamber 171 and receive the same degree of impregnation.

Although vacuum chambers have been described as having 2 and 3 chambers with each chamber containing a slot, it should be noted that the vacuum chamber can be constructed with any number of chambers and slots, however, it has been found to be advantageous to construct the vacuum chamber with at least two regions of reduced pressure that can act upon the fibrous material to be impregnated. It should also be noted, that any number of foam applicators and vacuum chambers can be utilized to impregnate the fibrous material.

As demonstrated by the above discussion, there are a number of options for producing the insulating material of the present invention. In general, when using the polymeric fiber mat, it may be produced:

(1) as a single layer that is resin stabilized,
(2) as a single layer that is reinforced with fibers applied to either the top, bottom or both sides of the polymeric fiber layer; or (3) as a combination of options (1) and (2).

With option one polymeric mats are preferably in the range of 70–90 g/ft² and the resin is added between 5–40% of the original polymeric mat weight. Thus for polymeric mats produced as described in option 1, the final basis weight ranges from about 70–130 g/ft². For option two, the fiber used as reinforcement is between 5–30% of the original mat weight resulting in a final basis weight from about 70 to 150 g/ft². Option three uses the combination of resin and fiber to stabilize and reinforce the polymeric mat; therefore, the final basis weight may range from about 70 to 180 g/ft².

Figure 9:
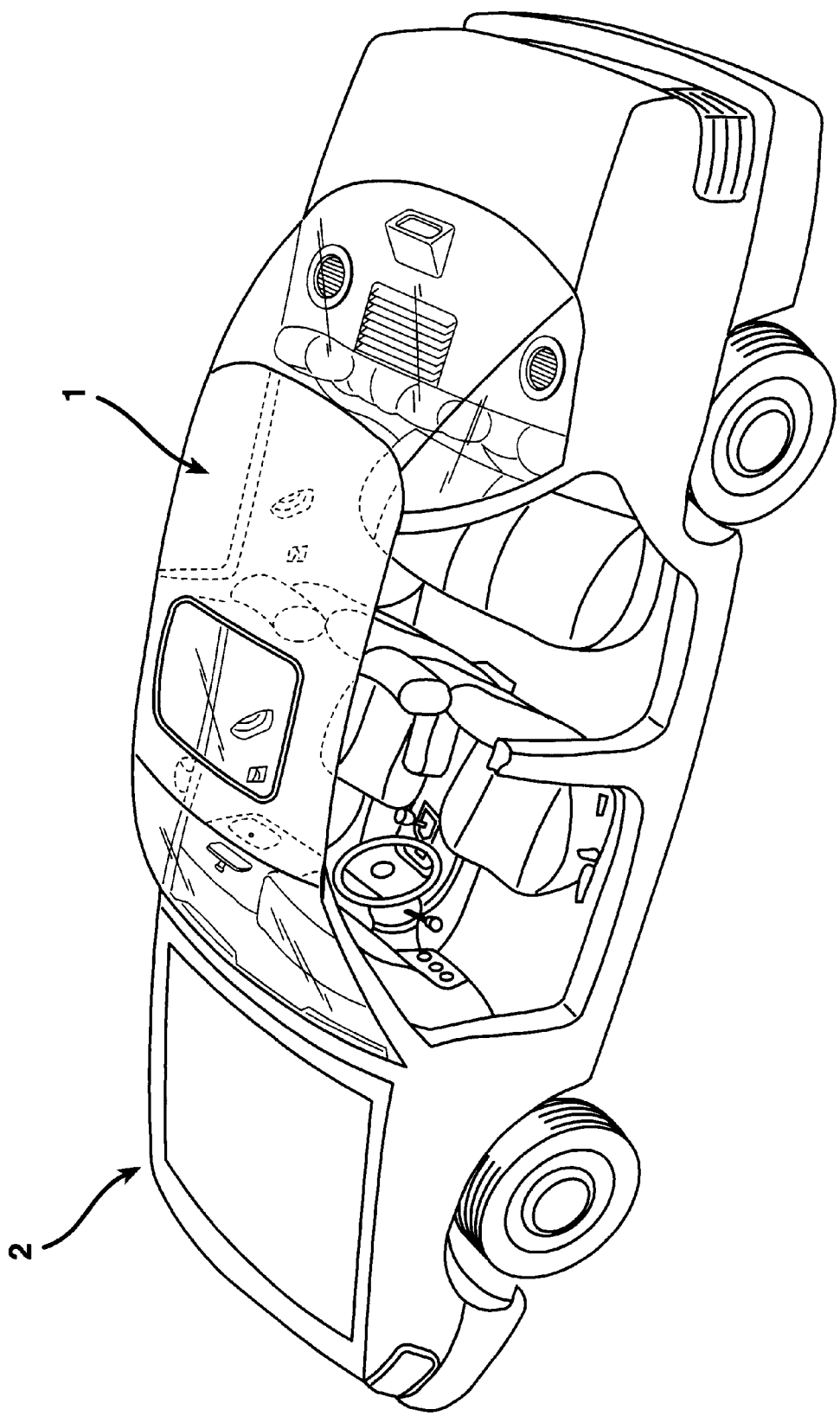
FIG. 9 is a drawing of an automobile showing positioning of a headliner (1) and a hoodliner (2) made according to the present invention.

The molding media, preferably with a final basis weight of about 40–120 g/ft² and more preferably 60–100 g/ft², is then molded into a final part such as an automotive headliner (1) or hoodliner (2) as is shown in FIG. 9. The molding may be carried out by either cold molding or hot molding processes. The preferred method is to unroll the molding media and then carry out a single-step hot molding with a polymer facing. The molding media may be cut to the outline of the desired part, such as a headliner, hoodliner, side pillars or rear deck package tray by any means. A preferred means is a water jet cutter. Once the part is molded subassemblies such as, for a headliner, sun visors, handgrips, coat hooks, dome lights and even duct work can then be attached.

In another embodiment, a multi-layered laminate is produced. The layers are sandwiched together by any of the methods used in the art for combining fiber mats together. Typically, the layers are mechanically stacked one on top of the other and processed as with the single layer embodiment. A preferred embodiment comprises six layers: a back facer web/shaper; a glue web; a core board absorber; a second glue web; a front facer web/shaper; and a decorative fabric facer/web.

For the back and/or front facer layers, materials such as polyester fiber containing added heat moldable fibers may be used. Preferred polyester fibers are those that may be purchased from Vita/Olympic as polyester terphthalate (PET) containing Celbond sheathed fibers for heat molding. The density range for the layer is from about 0.25 to about 4.0 with 1.5 lb/ft³ being preferred. The thickness of the typical layer ranges from about ⅛" to about 3 inches with ¼" being preferred. Fiber diameter ranges from about 2 to about 10 denier average with 4 being the average denier preferred. When using PET, the content of moldable fibers ranges from about 5% to about 70% with 30% being typical.

As for the glue web layer ($2^{nd}$ and $4^{th}$), this layer is optional, and may be made of any heat activated glue. A preferred glue is a porous glue such as Charnette®. Typically, the glue layer is not a continuous glue film since a continuous layer may block dissipation of sound energy by the acoustical layer or core board. The glue layer may be left out for flammability reasons, cost or to minimize complexity.

The core board or acoustical absorbing layer is typically comprised of either: (1) a standard insulation material such as a glass fiber bat:, glass wool, or textile glass; (2) a layered component made up of a glass fiber batt, or sandwiched between layers of polymeric fiber mat; or (3) a resin stabilized version of (1) or (2). A preferred glass fiber batt, is a basic bisected wool batt; in a particularly preferred embodiment the glass fiber insulation product Miraflex® obtained from Owens-Corning, Inc., is used. In addition to the above, the core board or acoustical absorbing layer may also be comprised of metal or mineral fiber, aerated concrete, gypsum board, or foams such as polyamide or any polymer.

The decorative fabric web layer is comprised of woven and/or nonwoven fabrics that are stretched and set so as to conform to the contours of the laminate. Preferred materials are standard polyesters, polyester blends, cottons, wool, wool blends, etc. The thickness of the layer ranges from about 0.010 inches to about 0.250 inches with 0.0625 inches being preferred.

Manufacture of the multi-layered laminate embodiment may be carried out by the standard techniques used for production of ceiling and wall tiles. For example, process methods such as heated hydraulic presses, batch process or continuous may be used.

EXAMPLE I

Preparation of Resole Resin

A resole resin composition was prepared as follows. A catalyst slurry was made with 1000 grams of water and 160 grams of calcium hydroxide. 6,470 grams of 52 percent formaldehyde and 2,480 grams of phenol were placed in the reaction vessel. This mixture was agitated for 5 minutes and then the temperature is raised to 115° F. While the temperature was held at 115° F., the catalyst slurry was added over a 2 hour period. The temperature was raised to 125° F. for 1 hour. The temperature was then raised to 150° F. and held at this temperature until the percent free phenol decreased below 12.5 percent. This took about 2–3 hours. Then the resin was cooled to 7° F. and stored until needed.

EXAMPLE II

Preparation of Resin Mix

The following was then placed in a reaction vessel: 363 grams of urea, 2.5 grams of silane and 5 grams of sodium hexamethyl phosphate. This was mixed for 5 minutes and 606 grams of the resole from Example I were added. This was stirred for 2 hours then the pH is adjusted to 75 with a combination of dimmonium phosphate and ammonium sulfate, or with phosphoric acid. This was mixed for 10 minutes and the pH adjusted to 8.0 to 8.5 with ammonia and 15 grams of Aerosol TO-75 was then mixed in. The resin was then ready for use.

EXAMPLE III

Table I shows the resin formulation foamed throughout a polyester fiber mat. Samples were prepared using that formulation and tested. Sample 1A is a ¼ inch cold-molded polyester fiber with no resin. Sample 1B is a ½ inch version of sample 1A. Sample 2A is a ¼ inch molded polyester with the resin foamed throughout; sample 2B is ½ inch thick. Table II shows the results of the three point bend test demonstrating the load the sample will withstand.

Samples were then prepared for acoustical testing. Sample 1A is ¼ inch molded AF glass fiber with the resin foamed throughout; 1B is ½ inch. Sample 6A is a ¼ inch molded polyester fiber with the resin foamed throughout; sample 6B is ½ inch thick. Table III gives the results of the sound absorption tests. Table IV shows the results of the three point bent test on samples 3A, 3B, 6A and 6B.

As the data in Table II demonstrate, samples 2A and 2B show the invention produces a significantly greater structural strength than an unresinated fiber mat. Surprisingly, from Table IV it is shown that the samples of the invention demonstrate an even improved strength with respect to resin foamed glass fiber batts. In Table III, the results further show that in applications where sound absorption is important, the samples of the invention generally absorb sound as well as resin foamed glass fiber batts.

TABLE I

Resin Formulation Batch Requirements

| Material | Lbs. | Gallons | Tank Height |
|---|---|---|---|
| Resin as in Example I | 6450.0 | 650 | 84.5" Down |
| Melamine (M:F, 1:2) | 99.5 | 13 | |
| Sulfamic Acid (36.43% RESIN) | 2285.2 | 248 | |
| Ammonia (2.65% RESIN) | 170.9 | 23 | 67.6" Down |
| Silane (0.1% Material solids) | 3.4 | | 1557 Grams |
| Urea (2% Resin solids) | 64.8 | 7 | |
| Premix Subtotal | 9073.8 | 941 | |
| Dawn (5.40% Material solids) | 185.4 | 22 | 0.1970 Lb/gal premix |
| OT-75 (0.789% Material solids) | 27.1 | 3 | 0.0288 Lb/gal premix |
| Subtotal | 9286.3 | 966 | |
| Water | 962.7 | 116 | 0.1228 Gal/gal premix |
| Total | 10249.0 | 1081 | |

| Material - Solids | Lbs. | Percent |
|---|---|---|
| Resin | 3237.9 | 94 |
| Formaldehyde | 63.7 | 2 |
| Melamine | 99.5 | 3 |
| Urea | 32.4 | 1 |
| Total | 3433.4 | 100 |

TABLE II

Flexural 3 point bend (ASTM D590 method I Procedure B) series 9 program 77 Instron cross head speed .5 in/min (high clutch)

| Sample 1A | Load at Yield (lbs) |
|---|---|
| Avg of 5 Samples | 0.732 |
| Std Dev | 0.023 |

| Sample 1B | Load at Yield (lbs) |
|---|---|
| Avg of 6 Samples | 0.660 |
| Std Dev | 0.103 |

| Sample 2A | Load at Yield (lbs) |
|---|---|
| Avg of 5 Samples | 3.356 |
| Std Dev | 0.540 |

| Sample 2B | Load at Yield (lbs) |
|---|---|
| Avg of 5 Samples | 3.543 |
| Std Dev | 0.573 |

TABLE III

Impedance
Normal Incidence Sound Absorption Test Results on Headliner Candidate Materials

| Frequency, Hz. | Sample 3A Avg. of 2 Samples | Sample 3B Avg. of 2 Samples |
|---|---|---|
| 100 | 0.008 | 0.009 |
| 125 | 0.010 | 0.013 |
| 160 | 0.009 | 0.017 |
| 200 | 0.012 | 0.021 |
| 250 | 0.013 | 0.029 |
| 315 | 0.016 | 0.039 |
| 400 | 0.021 | 0.053 |
| 500 | 0.030 | 0.071 |
| 630 | 0.028 | 0.100 |
| 800 | 0.042 | 0.141 |
| 1000 | 0.062 | 0.184 |
| 1250 | 0.091 | 0.257 |
| 1600 | 0.133 | 0.326 |

| Frequency, Hz. | Sample 6A Avg. of 2 Samples | Sample 6B Avg. of 2 Samples |
|---|---|---|
| 100 | 0.008 | 0.007 |
| 125 | 0.011 | 0.013 |
| 160 | 0.010 | 0.014 |
| 200 | 0.014 | 0.022 |
| 250 | 0.016 | 0.028 |
| 315 | 0.018 | 0.038 |
| 400 | 0.020 | 0.053 |
| 500 | 0.030 | 0.074 |
| 630 | 0.036 | 0.091 |
| 800 | 0.054 | 0.145 |
| 1000 | 0.076 | 0.204 |
| 1250 | 0.108 | 0.274 |
| 1600 | 0.154 | 0.367 |

Note the values given are presented as a percent of sound absorption.

TABLE IV

ASTM D790 Procedure B Method I
Flexural Strength - Cross head .5"/min Chart 1"/min sample sizes 4 inch × 12" with 10 inch span

| Sample: 3A - ¼" - std AF glass w/resin | Load @ Yield (lbs) |
|---|---|
| Avg of 6 Samples | 2.31 |
| Std Dev | 0.30 |

| Sample: 3B - ½" - std AF glass w/resin | Load @ Yield (lbs) |
|---|---|
| Avg of 6 Samples | 1.54 |
| Std Dev | 0.17 |

| Sample: 6A - ¼" - 15001 polyester w/resin | Load @ Yield (lbs) |
|---|---|
| Avg of 6 Samples | 2.85 |
| Std Dev | 0.19 |

| Sample: 6b - ½" - 15001 polyester w/resin | Load @ Yield (lbs) |
|---|---|
| Avg of 6 Samples | 1.72 |
| Std Dev | 0.11 |

EXAMPLE IV

Figure 10:
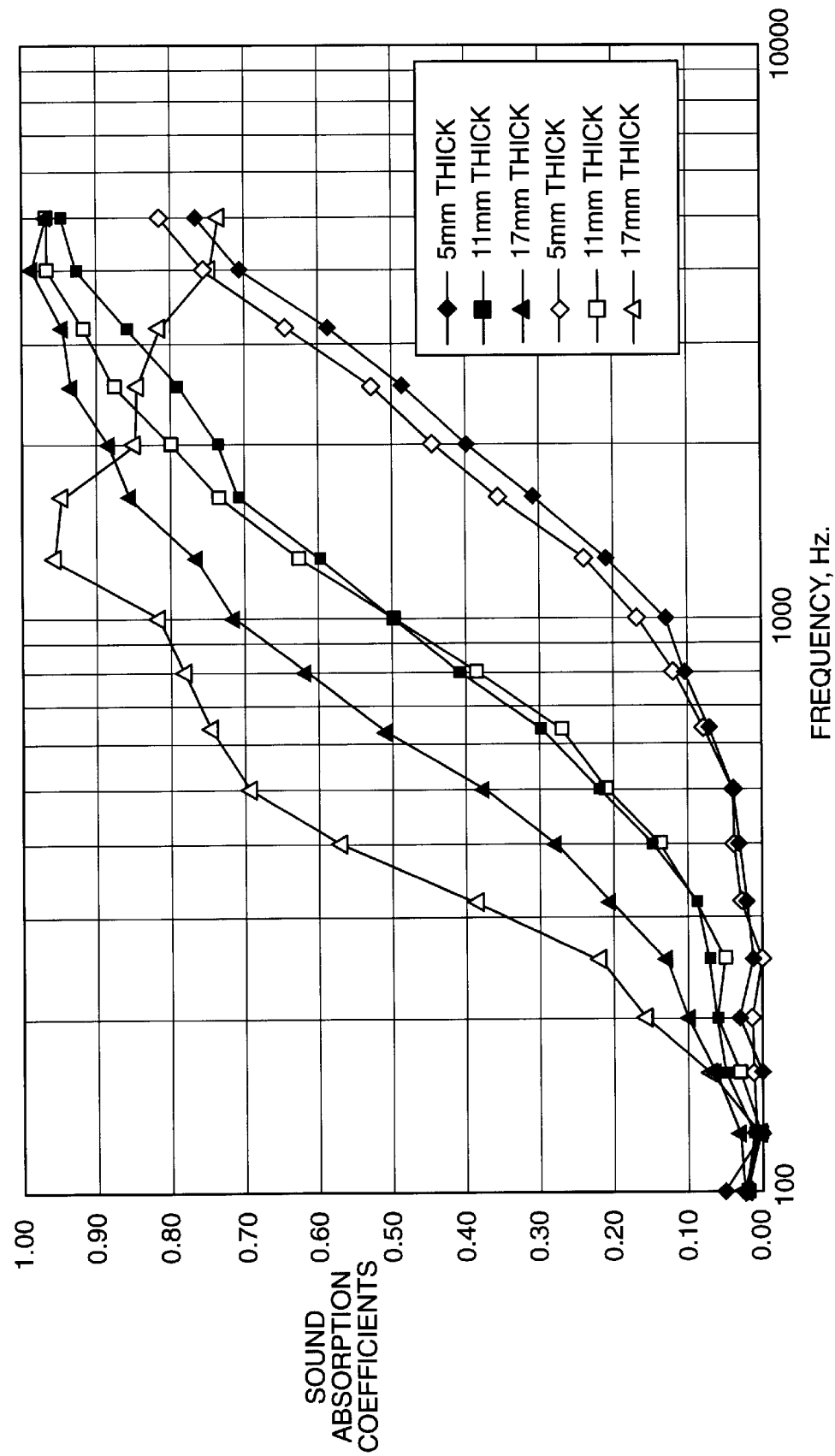
FIG. 10 is a graph showing the results of testing for the effect of binder fiber contained in the polymer fiber mats, on sound absorption.

Table VI shows the resin formulation foamed throughout a polyester fiber mat. Samples were prepared using the formulation and tested. Samples were prepared at three different thicknesses of polyester fiber mat, 5 mm, 11 mm and 17 mm. In addition, there are two different sample types of polyester mat for each thickness. One set consists of a polyester fiber mat containing 30% Celbond Tea (binder fiber) whereas the other set contains 15% Celbond T™. FIG. 10 gives the results of the effect of binder content on sound absorption. As the data demonstrates in general, polyester fiber mats having lower binder fiber (Celbond™) concentrations provide greater sound absorption capacity. Accordingly, lower cost raw materials can be utilized in the invention without any loss in sound absorption capacity.

| Sample No. | Description |
|---|---|
| 1 | 5 mm Polyester - 30% Celbond ™ |
| 2 | 11 mm Polyester - 30% Celbond ™ |
| 3 | 17 mm Polyester - 30% Celbond ™ |
| 4 | 5 mm Polyester - 15% Celbond ™ |
| 5 | 11 mm Polyester - 15% Celbond ™ |
| 6 | 17 mm Polyester - 15% Celbond ™ |

Figure 11:
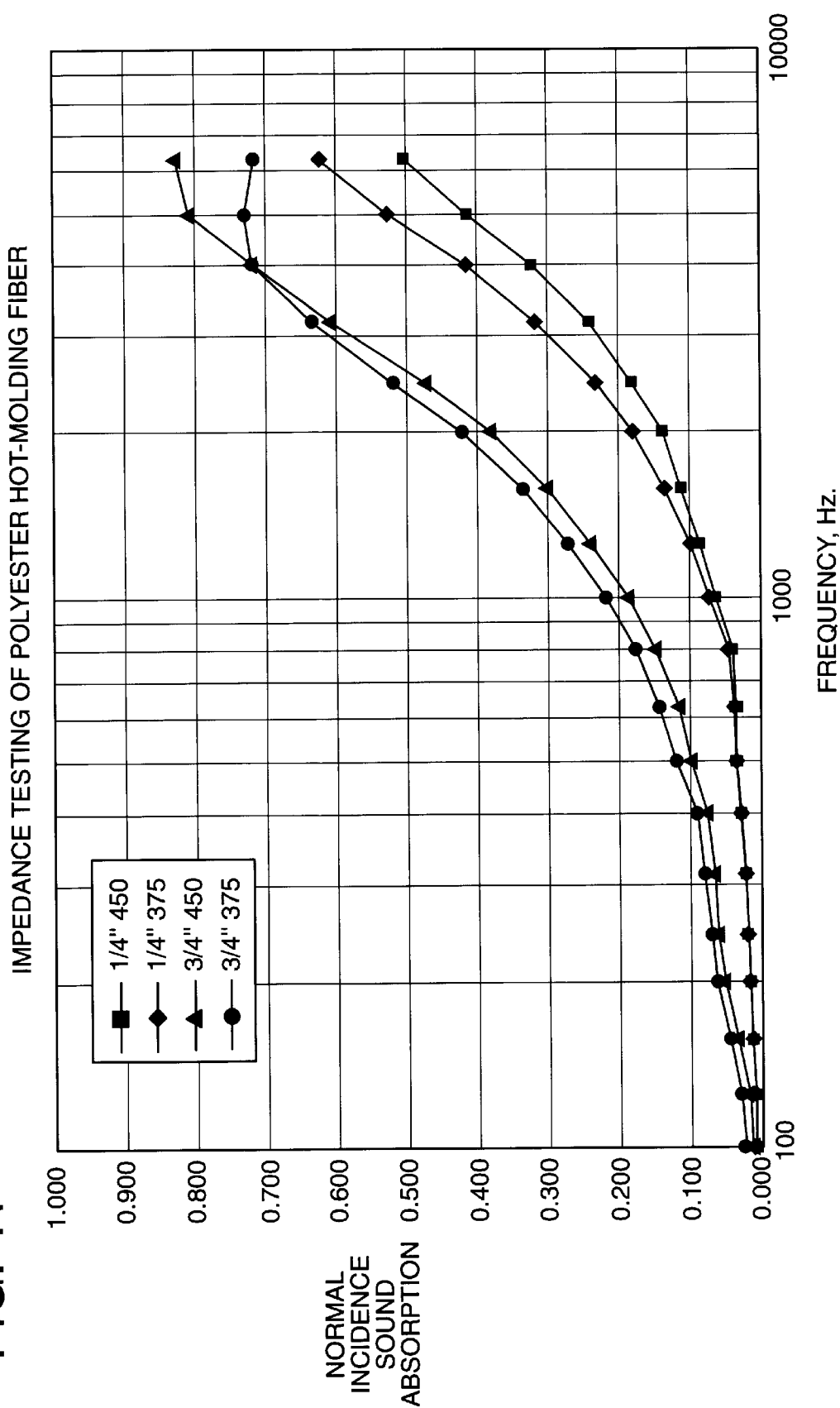
FIG. 11 is a graph showing the results of the effect of selected molding temperatures on sound absorption tests carried out on ¼ and ¾" diameter samples.
Figure 12A:
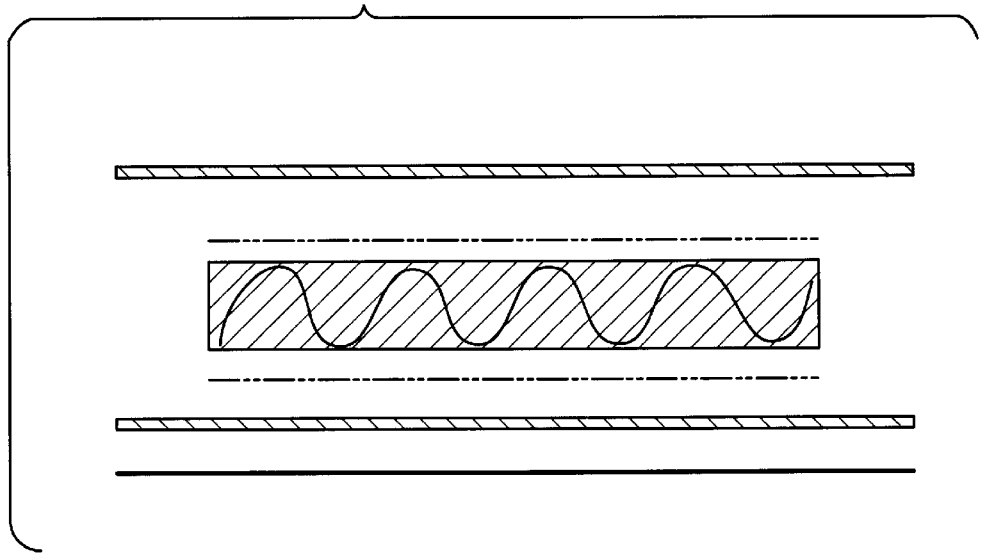
FIG. 12 shows a representative cross-sectional view of the multi-layered laminate embodiment prior to molding (12a). FIG. (12b) is a representative cross-sectional drawing of the laminate tile after molding with heat and/or pressure.
Figure 12B:
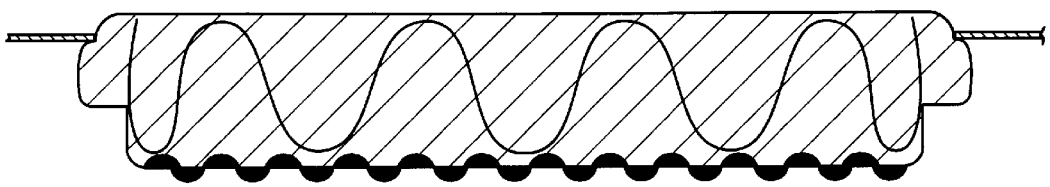

FIG. 11 gives the results of the effect of molding temperature on sound absorption test results for ¼ and ¾" diameter samples. Each sample was tested in large impedance tubes (for <6,000 Hz) and in small impedance tubes (>6,000 Hz). The data demonstrates that samples molded at the lower temperature of 375° Fahrenheit out perform the samples molded at the higher temperature of 450° F. These samples contained 15% Celbond™ binder fiber.

TABLE V

Resin (for components used at <200° F.

| | | |
|---|---|---|
| % solids | 43.3 | |
| % formaldehyde | 9.4 | |
| % desired overall solids | 41.0 | |

| DAP Mix | lbs. | Gallons | |
|---|---|---|---|
| water | 434.0 | 52.3 | |
| diamonium phosphate | 138.2 | — | |
| Total | 572.2 | 67.0 | |

| Material | lbs. | Gallons | |
|---|---|---|---|
| urea (F:U, 1:1 + 8.47% excess) | 3997.3 | 420.0 | |
| A1100 silane (0.367% resin) | 36.0 | 4.0 | 16316 grams |
| Resin (from above) | 9801.0 | 990.0 | |
| DAP (5.838% resin) | 572.2 | 67.0 | |
| Premix Subtotal | 14406.5 | 1481.0 | |
| ammonium sulfate/Calgon (3.135% resin) | 307.3 | 32.6 | |
| OT-75 (2.805% premix) | 404.1 | 45.2 | |
| yellow dye (BASF base acid) (0.743% premix) | 107.0 | 10.7 | |
| ammonia (2.57% premix) | 370.4 | 50.1 | |
| Subtotal | 15595.3 | 1619.6 | |
| water (8.228% premix) | 1185.4 | 142.3 | |
| Total | 16780.6 | 1761.9 | |

| Material Solids | | |
|---|---|---|
| Resin[1] | 4241.9 | |
| Urea | 1998.7 | |
| Formaldehyde | 921.3 | |
| Total | 7161.5 | |

[1]A resole resin having .42% free phenol sold as RE131 obtained from Owens-Corning.

Resin from Table V was prepared as follows. The DAP mixture was dissolved in water heated to 125–150° F. This mixture was then agitated continuously and the temperature was lowered to 95° F. and held there for 2 hours while the catalyst slurry was added. The ammonium sulfate was added to the premix; it was added until the pH was from 8.95 to 9.0.

TABLE VI

Resin (for components used at >200° F.)

| | | | |
|---|---|---|---|
| % solids | 53.1 | | |
| % formaldehyde at start | 0.70 | % left after 1 day | 0.69 |
| % overall solids | 34.0 | | |

| Material | lbs | Gallons | Tank Height |
|---|---|---|---|
| resin | 7192.0 | 725 | 80.1" down |
| melamine (M:F, 1:2) | 73.3 | 9 | |
| ammonia (2.65% resin) | 190.6 | 26 | |
| sulfamic acid (36.79% resin) | 2645.9 | 288 | 88.0" down |
| silane (0.1% material solids) | 3.8 | | .745 grams |
| urea (2% resin solids) | 73.7 | 8.0 | |
| Premix Subtotal | 10179.4 | 1055.5 | |
| Dawn (6% material solids) | 230.9 | 27 | .2187 lb/gal premix |
| OT-75% (0.789% material solids) | 30.4 | 3 | .0288 lb/gal premix |
| Subtotal | 10440.6 | 1086 | |
| water (add to desired solids) | 876.5 | 105 | 0.0997 gal/gal premix |
| Total | 11317.1 | 1191 | |

| Material Solids | Lbs. | Percent |
|---|---|---|
| resin[2] | 3687.3 | 96 |
| formaldehyde | 50.3 | 1 |
| melamine | 76.3 | 2 |
| urea | 36.9 | 1 |
| Totals | 3847.8 | 100 |

[2]A resole resin having 2.5% free phenol sold as IB809B obtained from Borden.

In preparing the resin of Table VI, the material components are continuously agitated at 65° F. When the sulfamic acid is added, the pH should be less then 9.0. The ammonia is added when there are still 75 gallons of sulfamic acid to be added. Prior to adding the silane, the temperature is raised to 120° F.; it is then lowered to 100° F. before adding the urea.

Another resin formulation is prepared for use in applications wherein lower dust levels in molded products are desired, and those where greater toughness is required. This formulation uses the resin of Table VI with the following differences given in Table VII. The material is agitated and mixed at 100° F.

TABLE VII

| Material | % Solids | | | |
|---|---|---|---|---|
| Resin from Table VI | 34.0 | | | |
| BF Goodrich V-29 Latex (Hystretch-elastomeric latex emulsion) | 48.2 | | | |
| Latex desired solids | 35.0 | | | |
| Overall solids | 36.0 | | | |

| Material | lbs. | Gallons | Percent | Premix |
|---|---|---|---|---|
| Resin Table VI | 6600.0 | 695.5 | 0.69 | 617 gal. |
| Latex (add to desired %) | 2506.9 | 290.1 | 0.26 | |
| OT-75 (2% latex solids) | 24.2 | 2.7 | — | |
| Subtotal | 9131.0 | 988.4 | | |
| water (to desired solids) | 458.7 | 55.1 | 0.05 | |
| Total | 9589.7 | 1043.5 | | |

| Material Solids | lbs. | | | |
|---|---|---|---|---|
| Resin | 2244.0 | | | |

TABLE VII-continued

| | |
|---|---|
| Latex | 1208.3 |
| | 3552.3 |
| Solution solids before water | 37.8 |

EXAMPLE V

Manufacture of Multi-Layer Laminate Ceiling/Wall Tile

A heated hydraulic press mold was used to prepare an embossed/textured 2 ft.×2 ft. ceiling panel. Mold release was sprayed in the mold which was then placed in a hydraulic heat press set to 385° F. Both upper and lower platens were used.

Figure 13:
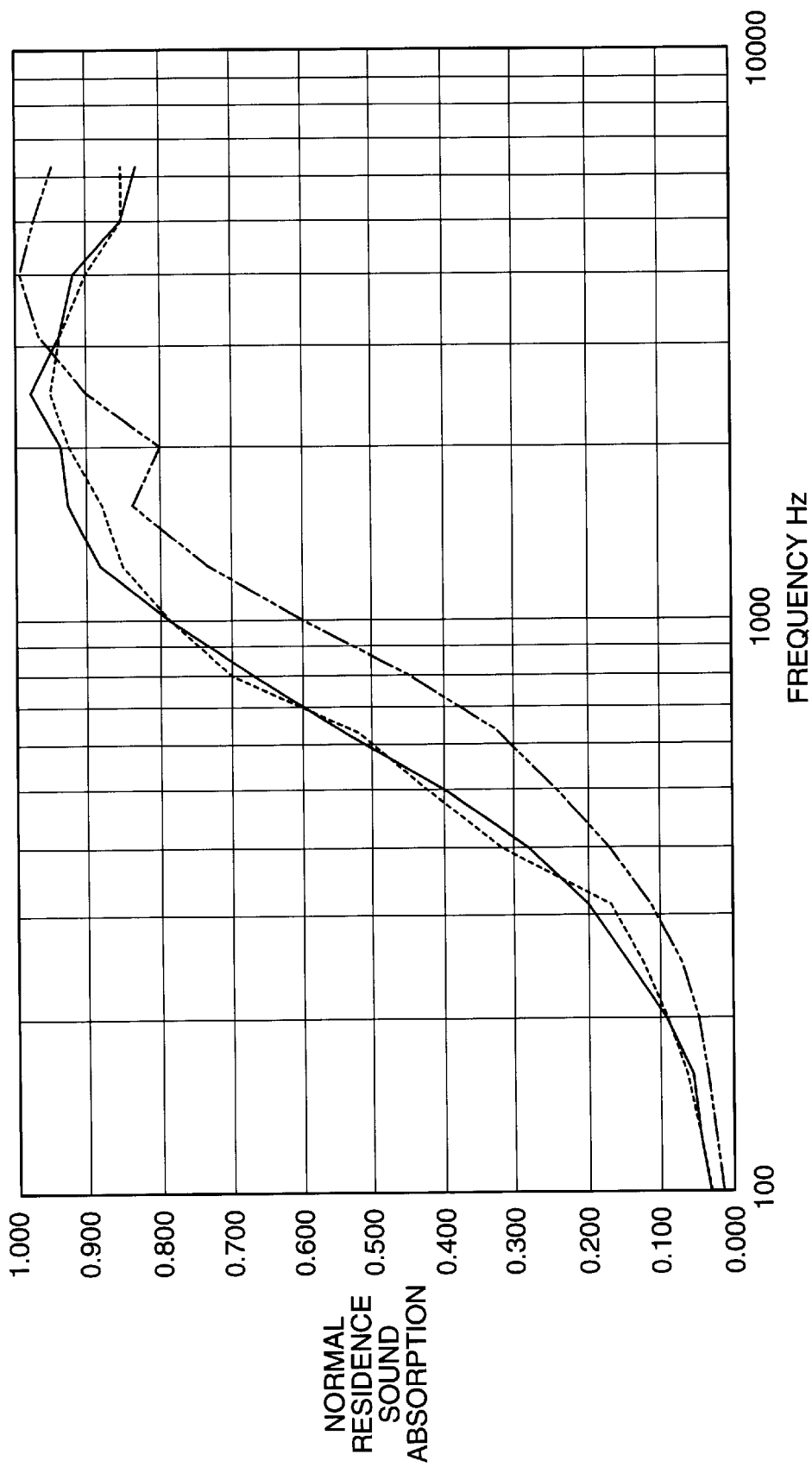
FIG. 13 shows graphs of impedance testing (FIG. 13a) and airflow resistance testing (FIG. 13b) on molding ceiling tiles produced as a multi-layered laminate.
Figure 13A:
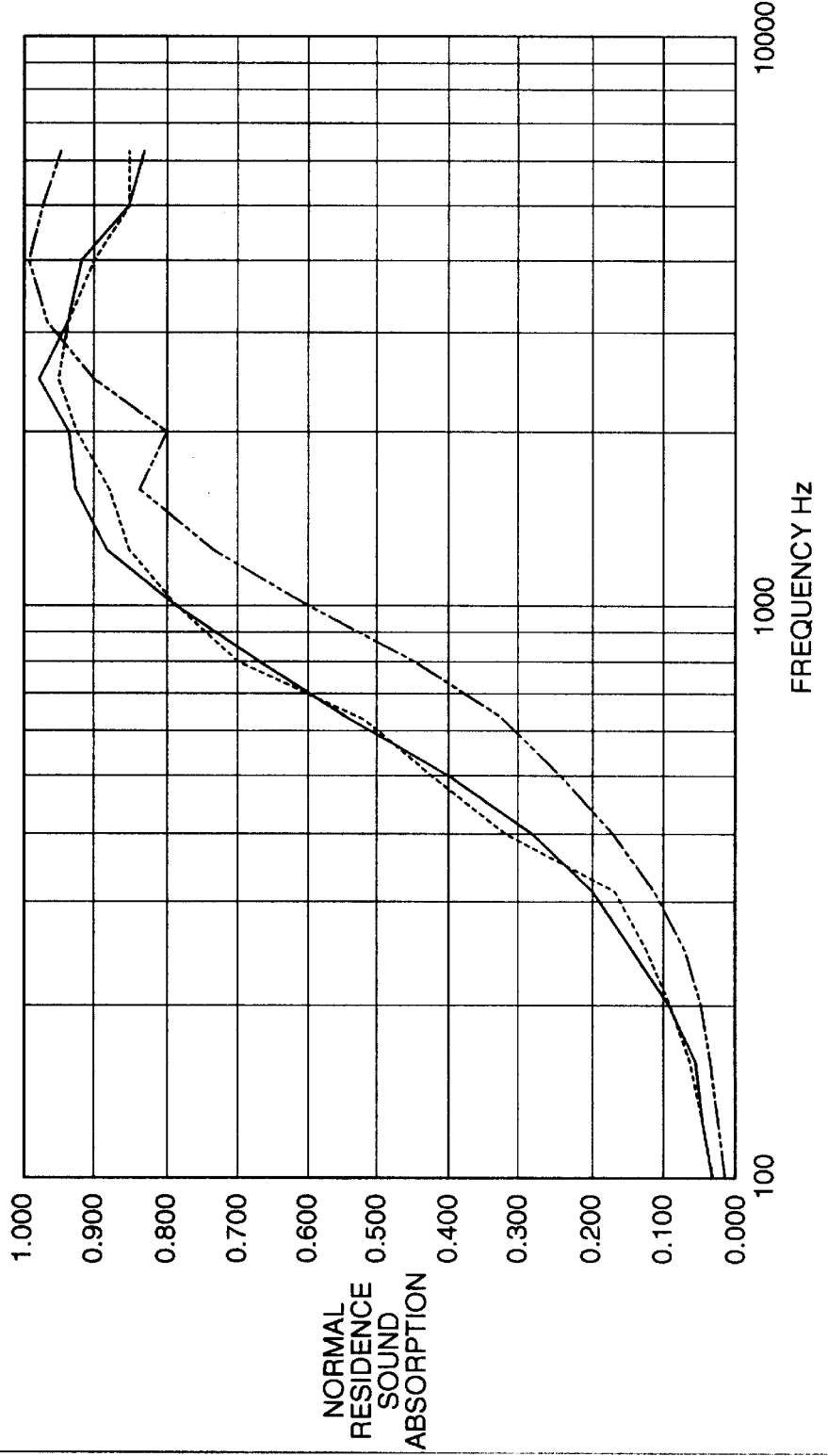

The resulting tile was tested for impedance and air flow. The tile was tested alone and against a baseline piece of ductboard (¾" skived). The tile was also tested for acoustical absorbance properties. The results may be seen in FIGS. 13a and b. The results have allowed us to conclude that the acoustical properties can be tuned to fit the application and cost target. For example, NRC values equal to 1.00 may be achieved by using a glass wool core, small diameter fiber, medium density and high rayls cover sheet fabric.

What is claimed is:

1. An automobile headliner comprising a mat product comprising:
   (a) a polymeric fibrous mat; and
   (b) a foamed resin dispersed throughout said fiber mat, wherein the mat product has a final basis weight of between 40 g/ft$^2$ and about 120 g/ft$^2$.

2. The molding media of claim 1, wherein said polymeric fibrous mat comprises polyester fibers.

3. The molding media of claim 2, wherein said foamed resin when cured comprises from about 5% to about 45% of the total weight of the mat product.

4. The molding media of claim 1, wherein said resin is selected from the group consisting of phenol formaldehyde, melamine, epoxy, polyester, thermoplastic resins, acrylics, vinyls, urea, formaldehyde, polyurethanes, isocyanates, isocyanurates, or resoles.

5. The molding media of claim 4, wherein said resin is a resole resin.

6. The molding media of claim 1, wherein said polymeric fiber is a nylon.

7. The molding media of claim 1, wherein said polymeric fiber is a rayon.

8. The molding media of claim 1, wherein said polymeric fiber is selected from the group consisting of polycaprolactam, nylon 6, polyolefins, polypropylene and nylon 6,6.

9. A molding media as in claim 1, wherein said polymeric fibrous mat further comprises about 10 to 40% weight of binder fiber.

10. The molding media of claim 9 wherein said polymeric fibrous mat comprises about 10 to 20% binder fiber.

11. The molding media of claim 9, wherein said polymeric fibrous mat comprises about 20 to 40% binder fiber.

12. A method for producing an automobile headliner comprising:
    (a) dispersing a foamed resin into a mat formed of polymeric fibers;
    (b) drying the resinated mat to form a molding media; and
    (c) molding the media at an elevated temperature to form a molded part,
    wherein the molded part has a final basis weight of between 40 g/ft$^2$ and about 120 g/ft$^2$.

13. The method of claim 12, wherein said polymeric fibers are comprised of polyester fibers.

14. The method of claim 12, wherein said polymeric fibers are selected from the group consisting of polypropylene, polycaprolactam, nylon 6, polyolefins, or nylon 6,6.

15. The method of claim 12, wherein said molding is carried out at a temperature of from about 375 to 450 degrees Fahrenheit.

16. The molding of claim 15, wherein said molding is carried out at a temperature of about 375 degrees Fahrenheit.
    (a) preparing a 3 layered composite mat by sandwiching a baft of glass fiber between 2 layers of mats formed of polymeric fibers;
    (b) dispersing a foamed resin into said 3 layer composite;
    (c) drying the resinated composite mat to form a molding media; and
    (d) molding the media at an elevated temperature to form a molded part.

17. An automobile hoodliner comprising a mat product comprising:
    (a) a polymeric fibrous mat; and
    (b) a foamed resin dispersed throughout said fiber mat, wherein the mat product has a final basis weight of between 40 g/ft$^2$ and about 120 g/ft$^2$.

* * * * *

UNITED STATES PATENT AND TRADEMARK OFFICE
CERTIFICATE OF CORRECTION

PATENT NO.   : 6,133,172
DATED        : October 17, 2000
INVENTOR(S)  : Sevenish et al.

Page 1 of 1

It is certified that error appears in the above-identified patent and that said Letters Patent is hereby corrected as shown below:

In the claims:

Column 24,
please delete the following lines 31 through 38:

(a) preparing a 3 layered composite mat by sandwiching a baft of glass fiber between 2 layers of mats formed of polymeric fibers;
(b) dispersing a foamed resin into said 3 layer composite;
(c) drying the resinated composite mat to form a molding medial; and
(d) molding the media at an elevated temperature to form a molded part.

Signed and Sealed this

Seventeenth Day of July, 2001

Attest:

*Attesting Officer*

NICHOLAS P. GODICI
*Acting Director of the United States Patent and Trademark Office*